United States Patent
Yamamoto et al.

(10) Patent No.: US 11,695,526 B2
(45) Date of Patent: Jul. 4, 2023

(54) TERMINAL AND TRANSMISSION METHOD

(71) Applicant: Panasonic Intellectual Property Corporation of America, Torrance, CA (US)

(72) Inventors: Tetsuya Yamamoto, Kanagawa (JP); Ankit Bhamri, Hessen (DE); Hidetoshi Suzuki, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 84 days.

(21) Appl. No.: 17/052,408

(22) PCT Filed: Jan. 9, 2019

(86) PCT No.: PCT/JP2019/000368
§ 371 (c)(1),
(2) Date: Nov. 2, 2020

(87) PCT Pub. No.: WO2019/215956
PCT Pub. Date: Nov. 14, 2019

(65) Prior Publication Data
US 2021/0167912 A1 Jun. 3, 2021

(30) Foreign Application Priority Data
May 8, 2018 (JP) .................................. 2018-090118

(51) Int. Cl.
*H04L 5/00* (2006.01)
*H04W 52/14* (2009.01)
(Continued)

(52) U.S. Cl.
CPC ......... *H04L 5/0048* (2013.01); *H04W 52/146* (2013.01); *H04W 72/0446* (2013.01); *H04W 72/21* (2023.01)

(58) Field of Classification Search
None
See application file for complete search history.

(56) References Cited

U.S. PATENT DOCUMENTS

2018/0035332 A1* 2/2018 Agiwal ............. H04W 72/1247
2018/0183554 A1* 6/2018 Lim ..................... H04L 5/005
(Continued)

FOREIGN PATENT DOCUMENTS

WO 2017/195653 A1 11/2017

OTHER PUBLICATIONS

3GPP TS 38.211 V15.1.0, "3rd Generation Partnership Project; Technical Specification Group Radio Access Network; NR; Physical channels and modulation (Release 15)," Mar. 2018, 91 pages.
(Continued)

*Primary Examiner* — Hassan A Phillips
*Assistant Examiner* — Gautam Sharma
(74) *Attorney, Agent, or Firm* — Seed IP Law Group LLP

(57) ABSTRACT

The present disclosure provides a terminal capable of efficiently transmitting data of different services. In this terminal (200), a controller (209) determines a transmission operation of a first transmission, corresponding to a first service, and a second transmission, corresponding to a second service, based on the first transmission and a setting of a reference signal included in the second transmission. A transmitter (216) transmits an uplink signal including at least a signal of the first transmission based on the determined transmission operation.

5 Claims, 28 Drawing Sheets

(51) Int. Cl.
*H04W 72/0446* (2023.01)
*H04W 72/21* (2023.01)

(56) References Cited

U.S. PATENT DOCUMENTS

| | | | |
|---|---|---|---|
| 2018/0279291 A1* | 9/2018 | Tiirola | H04W 72/0413 |
| 2018/0324816 A1* | 11/2018 | Islam | H04L 5/0053 |
| 2019/0075582 A1* | 3/2019 | Kim | H04L 5/0053 |
| 2019/0110293 A1* | 4/2019 | Li | H04W 28/0205 |
| 2019/0191443 A1* | 6/2019 | Sano | H04L 29/06 |
| 2019/0268938 A1* | 8/2019 | Zhao | H04W 80/08 |
| 2019/0357236 A1* | 11/2019 | Fu | H04L 5/005 |
| 2020/0007302 A1* | 1/2020 | Manolakos | H04L 5/023 |
| 2020/0008216 A1* | 1/2020 | Iyer | H04W 72/042 |
| 2020/0120511 A1* | 4/2020 | Liu | H04W 72/14 |
| 2020/0228240 A1* | 7/2020 | Hong | H04W 72/1263 |
| 2020/0344780 A1* | 10/2020 | Choi | H04L 5/0058 |
| 2020/0382248 A1* | 12/2020 | Leng | H04L 1/1854 |
| 2021/0037554 A1* | 2/2021 | Kim | H04L 5/0044 |
| 2021/0168824 A1* | 6/2021 | Lin | H04W 74/02 |

OTHER PUBLICATIONS

3GPP TS 38.212 V15.1.0, "3rd Generation Partnership Project; Technical Specification Group Radio Access Network; NR; Multiplexing and channel coding (Release 15)," Apr. 2018, 94 pages.
3GPP TS 38.213 V15.1.0, "3rd Generation Partnership Project; Technical Specification Group Radio Access Network; NR; Physical layer procedures for control (Release 15)," Mar. 2018, 77 pages.
International Search Report, dated Mar. 19, 2019, for corresponding International Application No. PCT/JP2019/000368, 4 pages.
LG Electronics, "Discussion on multiplexing UL transmission with different requirements," R1-1804572, Agenda Item: 7.2.4, 3GPP TSG RAN WG1 Meeting #92bis, Athens, Greece, Apr. 16-20, 2018, 8 pages.
Mitsubishi Electric, "Discussions on UL multiplexing," R1-1804947, Agenda Item: 7.2.4 Study of handling UL multiplexing of transmissions with different reliability requirements, 3GPP TSG RAN WG1 Meeting #92b, Chennai, China, Apr. 16-20, 2018, 6 pages.
Vivo, "Summary of handling UL multiplexing of transmission with different reliability requirements," R1-1803359, Agenda Item: 7.2.4, 3GPP TSG RAN WG1 Meeting #92, Athens, Greece, Feb. 26-Mar. 2, 2018, 4 pages.
Zte et al., "UL multiplexing of transmissions with different reliability requirements," R1-1803803, Agenda Item: 7.2.4, 3GPP TSG RAN WG1 Meeting #92bis, Sanya, China, Apr. 16-20, 2018, 6 pages.

* cited by examiner

TERMINAL AND TRANSMISSION METHOD

TECHNICAL FIELD

The present disclosure relates to a terminal and a transmission method.

BACKGROUND ART

New Radio access technology (NR) has been developed to provide the 5th Generation mobile communication systems (5G) in the 3rd Generation Partnership Project (3GPP). Functions to support Ultra Reliable and Low Latency Communications (URLLC) as well as high-speed and large capacity communication, which are basic requirements of enhanced Mobile Broadband (eMBB), are main targets under study in NR (e.g., see Non-Patent Literatures (hereinafter, referred to as "NPL") 1 to 3).

Citation List

Non-Patent Literature

NPL 1
3GPP TS 38.211 V15.1.0, "NR; Physical channels and modulation (Release 15)," 2018-03
NPL 2
3GPP TS 38.212 V15.1.1, "NR; Multiplexing and channel coding (Release 15)," 2018-04
NPL 3
3GPP TS 38.213 V15.1.0, "NR; Physical layer procedure for control (Release 15)," 2018-03
NPL 4
R1-1803359, "Summary of handling UL multiplexing of transmission with different reliability requirements," vivo, RAN1 #92, March 2018
NPL 5
R1-1803803, "UL multiplexing of transmissions with different reliability requirements," ZTE, Sanechips, RAN1 #92bis, April 2018
NPL 6
R1-1804947, "Discussions on UL multiplexing," Mitsubishi Electric Co., RAN1 #92bis, April 2018
NPL 7
R1-1804572, "Discussion on multiplexing UL transmission with different requirements," LG Electronics, RAN1 #92bis, April 2018

SUMMARY OF INVENTION

Not enough studies have been carried out on a method of transmitting data of different services from one or a plurality of terminals, i.e., pieces of user equipment (UEs), in NR.

An embodiment of the present disclosure facilitaes providing a base station, a terminal, and a transmission method that enable the terminal to effectively transmit data of different services.

A terminal according to one aspect of the present disclosure includes: a circuit that determines a transmission operation of a first transmission, corresponding to a first service, and a second transmission, corresponding to a second service, based on the first transmission and a setting of a reference signal included in the second transmission, and a transmitter that transmits an uplink signal including at least a signal of the first transmission based on the determined transmission operation.

A transmission method according to one aspect of the present disclosure includes: determining a transmission operation of a first transmission, corresponding to a first service, and a second transmission, corresponding to a second service, based on the first transmission and a setting of a reference signal included in the second transmission, and transmitting an uplink signal including at least a signal of the first transmission based on the determined transmission operation.

It should be noted that general or specific embodiments may be implemented as a system, an apparatus, a method, an integrated circuit, a computer program or a recording medium, or any selective combination of the system, the apparatus, the method, the integrated circuit, the computer program, and the recording medium.

According to one exemplary embodiment of this disclosure, a terminal can efficiently transmit data of different services.

Additional benefits and advantages of the disclosed exemplary embodiments will become apparent from the specification and drawings. The benefits and/or advantages may be individually obtained by various embodiments and features of the specification and drawings, which need not all be provided in order to obtain one or more of such benefits and/or advantages.

DESCRIPTION OF EMBODIMENTS

Hereinafter, a detailed description will be given of embodiments of the present disclosure with reference to the accompanying drawings.

It is assumed, for example, that one terminal will be adaptive to a plurality of services, such as eMBB and URLLC, in NR. It is also assumed that, for example, terminals transmitting and receiving data of different services, such as eMBB and URLLC, will coexist in a cell of NR (hereinafter, referred to as "NR cell").

Figure 1:
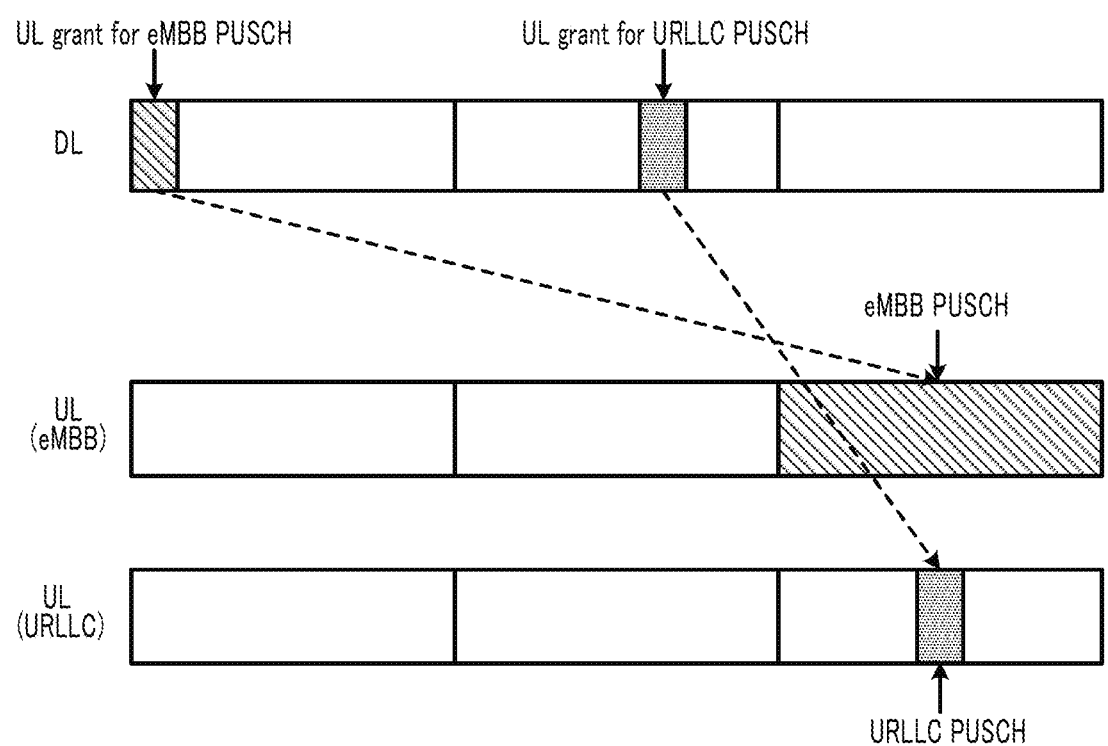
FIG. 1 is a diagram illustrating an example in which transmissions corresponding to eMBB and URLLC simultaneously occur in one terminal.
Figure 2:
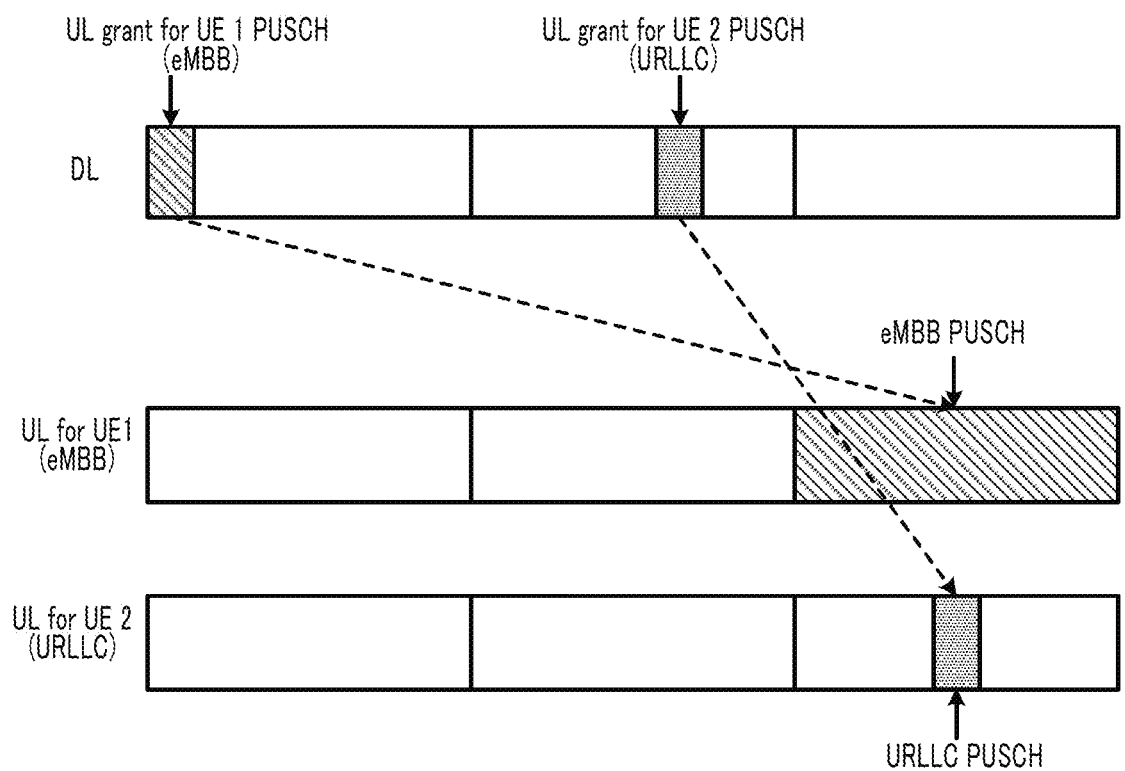
FIG. 2 is a diagram illustrating an example in which transmissions corresponding to eMBB and URLLC simultaneously occur in different terminals.

For example, in an uplink (UL) transmission as illustrated in FIGS. 1 and 2, a transmission corresponding to eMBB (hereinafter, may simply be referred to as "eMBB transmission") and a transmission corresponding to URLLC (hereinafter, may simply be referred to as "URLLC transmission") at times simultaneously occur or partially overlap in time.

FIG. 1 illustrates an example in which eMBB transmission and URLLC transmission simultaneously occur in one terminal. FIG. 2 illustrates an example in which eMBB transmission and URLLC transmission simultaneously occur between different terminals (e.g., UE1 and UE2) in a cell.

When eMBB transmission and URLLC transmission simultaneously occur in a terminal as illustrated in FIG. 1, the terminal can simultaneously transmit both an eMBB transmission signal (eMBB Physical Uplink Shared Channel (PUSCH)) and a URLLC transmission signal (URLLC PUSCH) without taking the mutual influence into consideration as long as the terminal is capable of simultaneously transmitting a plurality of uplink signals (e.g., eMBB PUSCH and URLLC PUSCH) and the simultaneous transmission of a plurality of uplink signals does not cause to exceed the maximum transmission power of the terminal.

In FIG. 1, however, the terminal operates, for example, so as to transmit either one of the eMBB transmission signal or the URLLC transmission signal, or to control the transmission power when the terminal cannot simultaneously transmit a plurality of uplink signals, or when the total sum of the transmission power exceeds the maximum transmission power even though the terminal is capable of simultaneously transmitting a plurality of uplink signals.

Herein, it is defined as requirements of URLLC in 3GPP to ensure a user plane latency of 0.5 ms or less on one way and a constant reliability, and achieve a latency of 1 ms or less. To meet such requirements of URLLC, the terminal, for example, prioritizes URLLC transmission over eMBB transmission.

In addition, when eMBB transmission and URLLC transmission simultaneously occur between different terminals in a cell as illustrated in FIG. 2, each terminal can simultaneously transmit both an eMBB transmission signal (eMBB PUSCH) and a URLLC transmission signal (URLLC PUSCH) without taking the mutual influence into consideration as long as different frequency resources are allocated to each terminal.

In FIG. 2, however, a terminal operation is required so that one of these terminals transmits a signal or the transmission power is controlled when the frequency resources allocated to the terminals are the same or partially overlapped. At this time, URLLC transmission (e.g., the transmission of UE 2 in FIG. 2) is prioritized over the other transmission operation of these terminals, for example, in order to meet the requirements of URLLC as described above.

Next, an example of a terminal operation that prioritizes URLLC transmission over eMBB transmission will be described.

Figure 3:
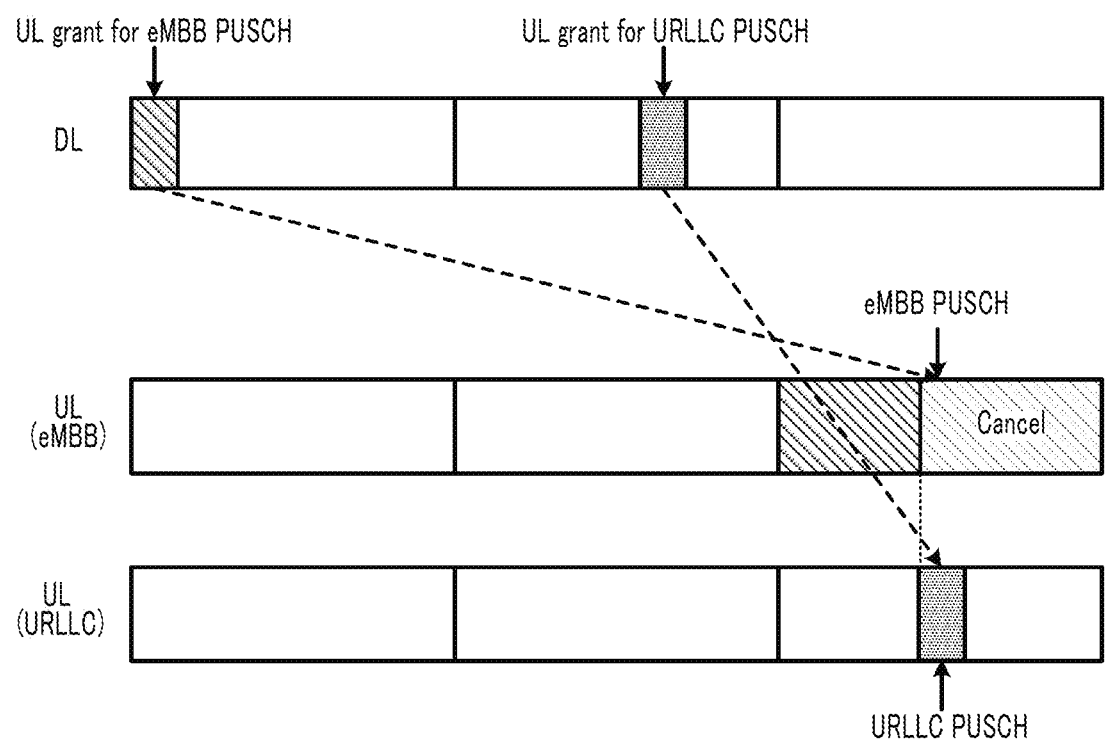
FIG. 3 is a diagram illustrating a transmission example in which eMBB and URLLC transmissions simultaneously occur.

Studies have been carried out on giving priority to URLLC transmission and canceling eMBB transmission in the section that URLLC transmission is interrupted and the subsequent section in the eMBB transmission section (e.g., 1 slot in FIG. 3) when, for example, eMBB transmission and URLLC transmission simultaneously occur as illustrated in FIG. 3 (see, for example, NPL 4). This may deteriorate the transmission quality and the frequency utilization efficiency of eMBB while the transmission quality of URLLC can be ensured.

Herein, it is assumed that the main use case is, for example, using a transmission in a slot unit (e.g., a transmission that uses one slot or most of the slot) since the amount of transmission data is relatively large in eMBB transmission. In contrast, it is assumed that the main use case is, for example, using a transmission not in a slot unit (e.g., a transmission that uses one to several symbols) since the amount of transmission data is relatively small and low latency is aimed in URLLC transmission.

Assuming the above-mentioned use cases, the transmission section in which URLLC transmission overlaps in time with eMBB transmission is, for example, a section corresponding to a part of eMBB transmission section (e.g., one to several symbols).

Figure 4:
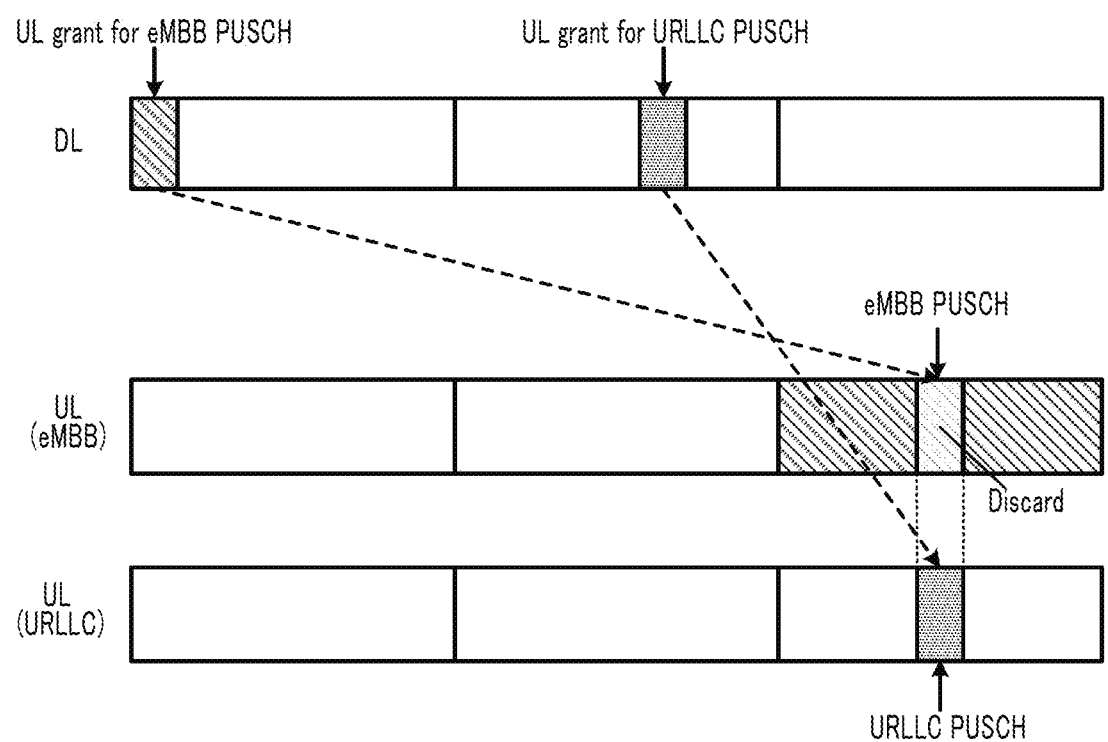
FIG. 4 is a diagram illustrating another transmission example in which eMBB and URLLC transmissions simultaneously occur.

In this regard, not in a method illustrated in FIG. 3, the terminal does not perform (discard) eMBB transmission in the section overlapping in time with the URLLC transmission section, for example, and performs eMBB transmission in the section other than the section overlapping in time with the URLLC transmission section, as illustrated FIG. 4, thereby suppressing deterioration of the transmission quality and the frequency utilization efficiency of eMBB. Note that the "process of discarding eMBB transmission" may be, for example, a "process of dropping eMBB transmission" or a "process of puncturing eMBB transmission signals".

In eMBB transmission, the part that overlaps in time with URLLC transmission (in other words, a losing signal) is not necessarily a data signal (e.g., a data symbol), and may also be a Demodulation Reference Signal (DMRS) of eMBB transmission. The loss of DMRS may deteriorate the channel estimation accuracy in the base station on the receiving side (may be referred to as gNB or eNB), and may also deteriorate the transmission quality of eMBB due to the deterioration of channel estimation accuracy.

Further, the channel estimation process using DMRS and the demodulation process of data symbols using the channel estimate assume that there is no phase discontinuity of transmission signals between DMRS and the data symbols. In general, it is not considered that the phase discontinuity of transmission signals occurs when the power or the center frequency of the Radio Frequency (RF) is not varied.

When eMBB transmission is discarded, however, in the part overlapping in time with URLLC transmission as illustrated in FIG. 4, for example, the transmission power is changed in the eMBB transmission section (e.g., the transmission power turns to 0 in the part overlapping in time with URLLC transmission). This case does not meet the condition described above that the phase discontinuity of transmission signals does not occur, and may cause the phase discontinuity of transmission signals in eMBB transmission.

Figure 5:
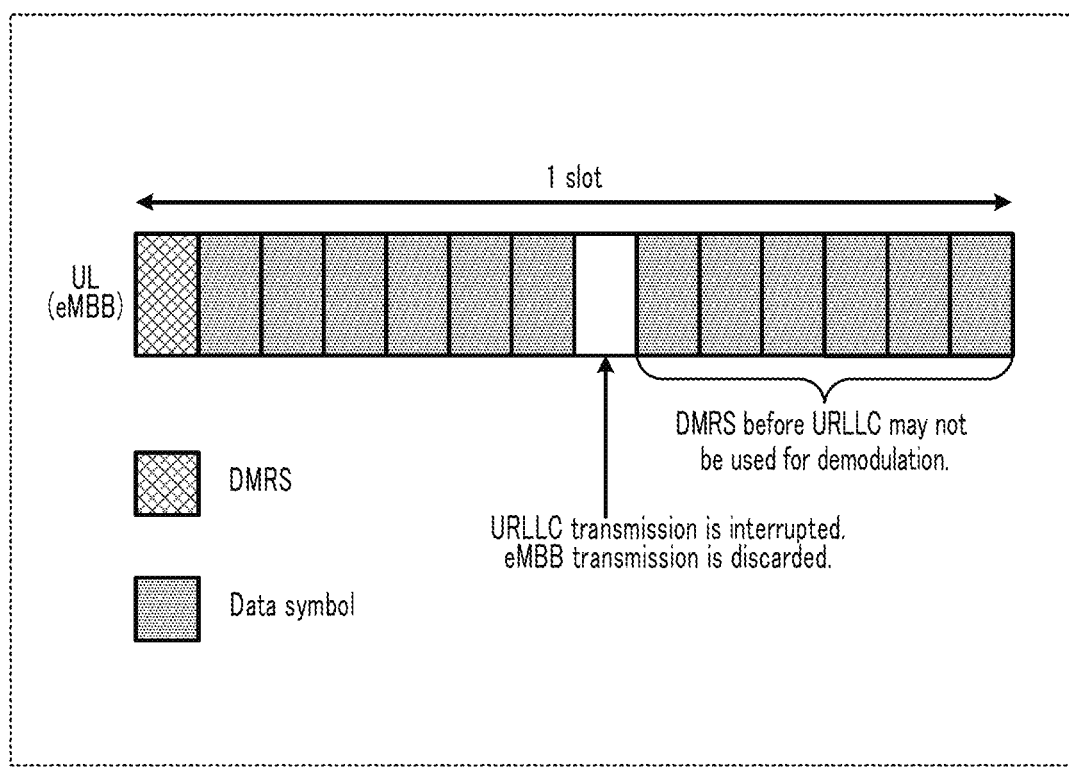
FIG. 5 is a diagram explaining phase discontinuity.

Thus, even though no DMRS of eMBB transmission is lost, for example, as illustrated in FIG. 5, the base station may not be able to demodulate the data symbols after URLLC transmission using DMRS that has been transmitted prior to URLLC transmission in eMBB transmission, and may deteriorate the transmission quality of eMBB. In this case, it is effective, for example, to cancel eMBB transmission in the symbol where URLLC transmission is interrupted and the symbols subsequent to the interruption (hereinafter, referred to as "URLLC-transmission-interrupted and subsequent symbols", e.g., the 8th and subsequent symbols in FIG. 5) as illustrated in FIG. 3.

In this regard, NPL 5, for example, discloses a method in which a base station transmits a control signal (e.g., a Preemption Indication (PI)) for indicating that URLLC transmission occurs in another terminal to a terminal performing eMBB transmission, and indicates whether or not to cancel eMBB transmission in URLLC-transmission-interrupted and subsequent symbols using the PI. The method disclosed in NPL 5, however, increases overhead of the control signal (e.g., PI). In addition, the method disclosed in NPL 5 does not consider the loss of DMRS.

Further, NPLs 6 and 7, for example, disclose methods of performing URLLC transmission while avoiding cancelation of DMRS (in other words, loss of DMRS) in eMBB transmission. The methods disclosed in NPLs 6 and 7, however, restrict the scheduling of URLLC transmission.

Furthermore, NPL 7 discloses a method of canceling eMBB transmission in URLLC-transmission-interrupted and subsequent symbols when DMRS is not transmitted. The method disclosed in NPL 7, however, may deteriorate the frequency utilization efficiency of eMBB when eMBB transmission in URLLC-transmission-interrupted and subsequent symbols is always canceled.

Accordingly, in one aspect of the present disclosure, a description will be given of a method for suppressing the deterioration of eMBB transmission quality or frequency utilization efficiency while ensuring the requirements of URLLC even when eMBB transmission and URLLC transmission simultaneously occur in uplink.

Embodiment 1

[Overview of Communication System]

The communication system according to the present embodiment includes base station 100 and terminal 200.

Figure 6:
FIG. 6 is a block diagram illustrating a configuration of a part of a terminal according to Embodiment 1.

FIG. 6 is a block diagram illustrating a configuration of a part of terminal 200 according to each embodiment of the present disclosure. In terminal 200 illustrated in FIG. 6, controller 209 determines the transmission operation of the first transmission, corresponding to the first service (e.g., URLLC), and the second transmission, corresponding to the second service (e.g., eMBB), based on the first transmission and the setting of the reference signal (e.g., DMRS) included in the second transmission. Transmitter 216 transmits an uplink signal including at least a signal of the first transmission based on the determined transmission operation.

[Configuration of Base Station]

Figure 7:
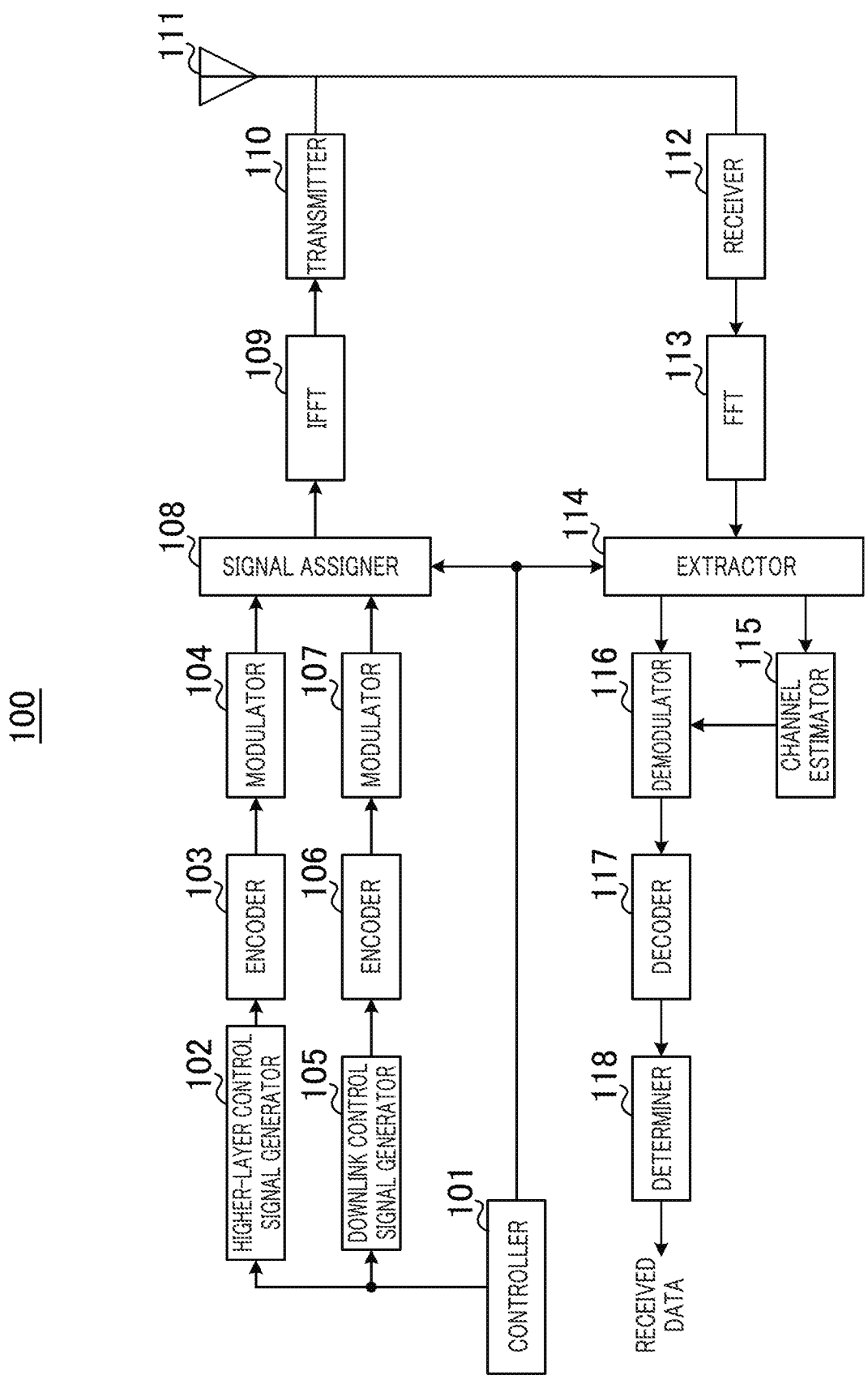
FIG. 7 is a block diagram illustrating a configuration of a base station according to Embodiment 1.

FIG. 7 is a block diagram illustrating a configuration of base station 100 according to Embodiment 1. In FIG. 7, base station 100 includes controller 101, higher-layer control signal generator 102, encoder 103, modulator 104, downlink control signal generator 105, encoder 106, modulator 107, signal assigner 108, Inverse Fast Fourier Transformer (hereinafter, referred to as "IFFT") 109, transmitter 110, antenna 111, receiver 112, Fast Fourier Transformer (hereinafter, referred to as "FFT") 113, extractor 114, channel estimator 115, demodulator 116, decoder 117, and determiner 118.

Controller 101 determines the control information on uplink data transmission of terminal 200, and outputs the determined control information to higher-layer control signal generator 102, downlink control signal generator 105 and extractor 114.

The information on uplink data transmission includes, for example, information on the DMRS setting, information for indicating that a transmission corresponding to URLLC occurs in another terminal, information indicating the schemes of coding and modulation (e.g., Modulation and Coding Scheme (MCS)), information indicating the radio resource allocation, and the like.

Further, the information to be outputted to higher-layer control signal generator 102 out of the information on uplink data transmission includes, for example, the information on DMRS setting. The information to be outputted to downlink control signal generator 105 out of the information on uplink data transmission, in contrast, includes, for example, the information for indicating that a transmission corresponding to URLLC occurs in another terminal, information on an uplink transmission whose transmission is indicated by a UL grant (e.g., the information indicating schemes of coding and modulation, or the information indicating radio resource allocation), and the like. Noted that the present disclosure is not limited to the above-mentioned examples, and the information on uplink data transmission may be included in either an uplink control signal or a downlink control signal.

In addition, controller 101 determines the radio resource allocation for downlink signals to transmit the uplink control signals or the downlink control signals, and outputs the downlink resource allocation information indicating the resource allocation of downlink signals to signal assigner 108. The downlink resource allocation information may be outputted to higher-layer control signal generator 102 or downlink control signal generator 105.

Higher-layer control signal generator 102 generates a control information bit string using the control information to be inputted from controller 101, and outputs the generated control information bit string to encoder 103.

Encoder 103 applies error correction coding to the control information bit string to be inputted from higher-layer control signal generator 102 and outputs the operation signal after the coding to modulator 104.

Modulator 104 modulates the control signal (the control information bit string) to be inputted from encoder 103, and outputs the control signal after the modulation (a modulation signal sequence) to signal assigner 108.

Downlink control signal generator 105 generates a control information bit string using the control information to be inputted from controller 101, and outputs the generated control information bit string to encoder 106.

Note that the control information is transmitted to a plurality of terminals 200 in some cases. In these cases, downlink control signal generator 105 may generate the bit string including the terminal ID of each terminal 200 (the information to identify each terminal) in the control information for each terminal 200 (e.g., information indicating the schemes of coding and modulation for the uplink transmission whose transmission is indicated by a UL grant or the radio resource allocation information). Further, the information for indicating that a transmission corresponding to URLLC occurs in another terminal may be transmitted so that a plurality of terminals 200 in the cell can receive. In that case, downlink control signal generator 105 may generate the bit string including an ID as a group unit, which is different from the individual ID of each terminal 200, in a signal including the information for indicating that a transmission corresponding to URLLC occurs in another terminal.

Encoder 106 applies error correction coding to the control information bit string to be inputted from downlink control signal generator 105 and outputs the operation signal after the coding to modulator 107.

Modulator 107 modulates the control signal (the control information bit string) to be inputted from encoder 106, and outputs the control signal after the modulation (a modulation signal sequence) to signal assigner 108.

Signal assigner 108 maps the control signal to be inputted from modulator 104 or modulator 107 to the radio resource based on the downlink resource allocation information to be inputted from controller 101. Signal assigner 108 outputs the downlink signal with the signal has been mapped thereto to IFFT 109.

IFFT 109 applies transmission waveform generation processing such as Orthogonal Frequency Division Multiplexing (OFDM) to the signal to be inputted from signal assigner 108. IFFT 109 applies Cyclic Prefix (CP) in an OFDM transmission applying CP (not illustrated). IFFT 109 outputs the generated transmission waveform to transmitter 110.

Transmitter 110 applies RF processing such as Digital-to-Analog (D/A) conversion and up-conversion to the signal to be inputted from IFFT 109, and transmits the radio signal to terminal 200 via antenna 111.

Receiver 112 applies RF processing such as down-conversion or Analog-to-Digital (A/D) conversion to an uplink signal waveform received from terminal 200 via antenna 111, and outputs the uplink signal waveform after the reception processing to FFT 113.

FFT 113 applies FFT processing for converting a time-domain signal into a frequency-domain signal to the uplink signal waveform to be inputted from receiver 112. FFT 113 outputs the resultant frequency-domain signal from the FFT processing to extractor 114.

Based on information received from controller 101, extractor 114 extracts each radio resource section including, for example, a signal corresponding to eMBB or a signal corresponding to URLLC from the signal to be inputted from FFT 113, and outputs the extracted radio resource components to demodulator 116. Further, extractor 114 extracts DMRS from each of the signal corresponding to eMBB and the signal corresponding to URLLC based on information received from controller 101 (e.g., information related to DMRS setting), and outputs the extracted DMRS to channel estimator 115.

Channel estimator 115 performs channel estimation, using DMRS to be inputted from extractor 114 and outputs the channel estimate to data demodulator 116.

Demodulator 116 demodulates the signal (e.g., the signal corresponding to eMBB or the signal corresponding to URLLC) to be inputted from extractor 114, using the channel estimate to be inputted from channel estimator 115, and outputs the demodulation result to decoder 117.

Decoder 117 performs error correction decoding using the demodulation result to be inputted from demodulator 116, and outputs the bit sequence after decoding to determiner 118.

Determiner 118 applies error detection processing to the bit sequence to be inputted from decoder 117. Determiner 118 outputs the bit sequence (received data) when no error is detected from the bit sequence. When an error is detected from the bit sequence, however, base station 100 may generate a response signal (ACK/NACK signal) and make a retransmission request to terminal 200 (not illustrated).

[Configuration of Terminal]

Figure 8:
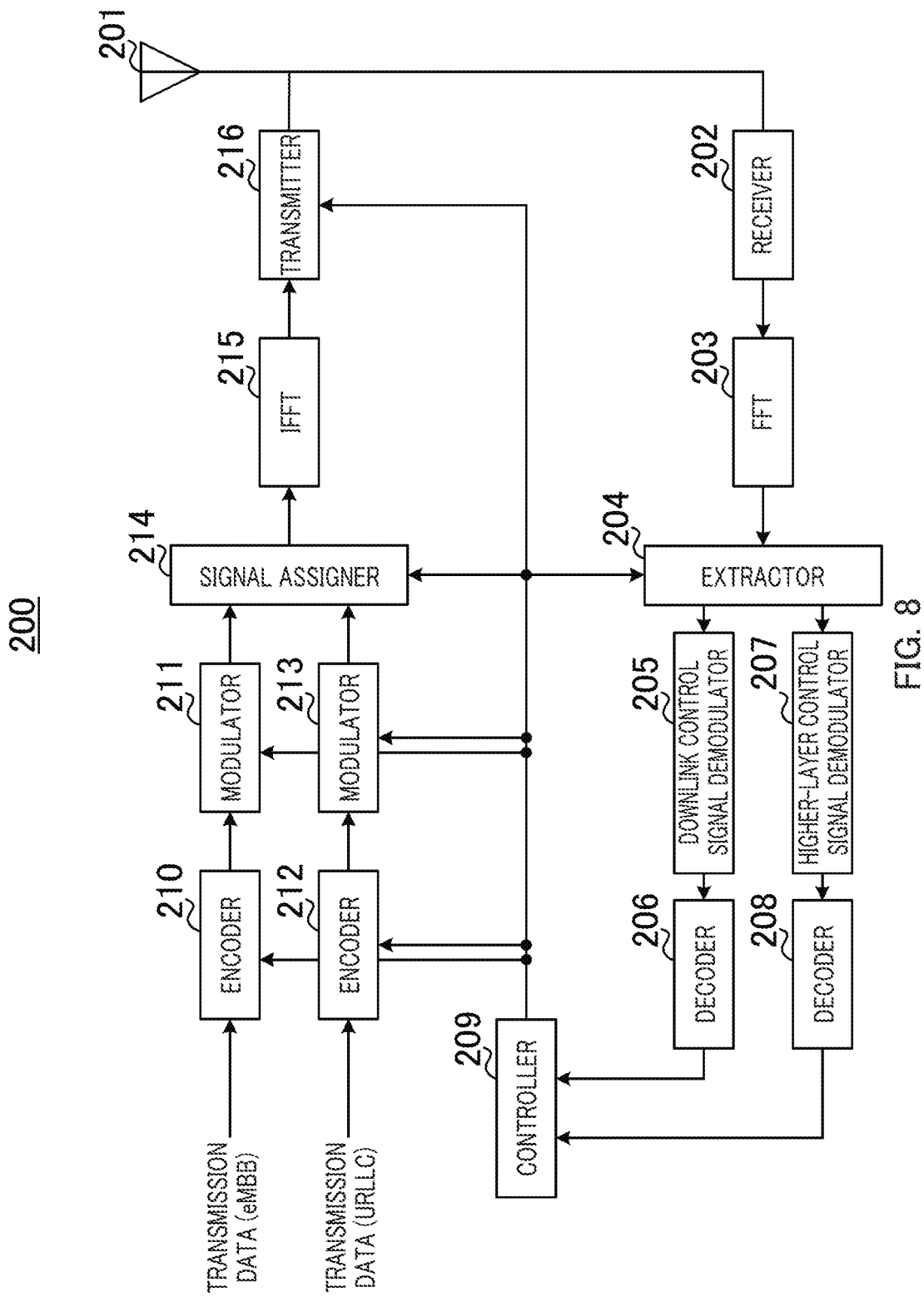
FIG. 8 is a block diagram illustrating a configuration of the terminal according to Embodiment 1.

FIG. 8 is a block diagram illustrating the configuration of terminal 200 according to Embodiment 1. In FIG. 8, terminal 200 includes antenna 201, receiver 202, FFT203, extractor 204, downlink control signal demodulator 205, decoder 206, higher-layer control signal demodulator 207, decoder 208, controller 209, encoders 210 and 212, modulators 211 and 213, signal assigner 214, IFFT 215, and transmitter 216.

Receiver 202 applies RF processing such as down-conversion or Analog-to-Digital (A/D) conversion to a signal waveform of a downlink signal (e.g., a control signal) received from base station 100 via antenna 201, and outputs the resultant reception signal (i.e., a baseband signal) to FFT 203.

FFT 203 applies FFT processing for converting a time-domain signal into a frequency-domain signal to the signal (i.e., time-domain signal) to be inputted from receiver 202. FFT 203 outputs the resultant frequency-domain signal from the FFT processing to extractor 204.

Extractor 204 extracts a reception signal including the downlink control signal from the signal to be inputted from FFT 203 based on the control information to be inputted from controller 209 (e.g., radio resource allocation information), and outputs to downlink control signal demodulator 205. Extractor 204 also extracts a reception signal including the uplink control signal based on the control information to be inputted from controller 209 (e.g., radio resource assignment information), and outputs the reception signal to higher-layer control signal demodulator 207.

Downlink control signal demodulator 205 applies blind decoding to the reception signal to be inputted from extractor 204. When the reception signal is determined to be a control signal addressed to terminal 200, downlink control signal demodulator 205 demodulates the control signal, and outputs the demodulation result to decoder 206.

Decoder 206 applies error correction decoding to the demodulation result to be inputted from downlink control signal demodulator 205, and obtains control information (e.g., a downlink control signal). Decoder 206 then outputs the resultant control information to controller 209.

Higher-layer control signal demodulator 207 demodulates the reception signal to be inputted from extractor 204, and outputs the demodulation result to decoder 208.

Decoder 208 applies error correction decoding to the demodulation result to be inputted from higher-layer control signal demodulator 207, and obtains control information (e.g., an uplink control signal). Decoder 208 then outputs the resultant control information to controller 209.

Controller 209, for example, acquires control information indicating the radio resource allocation for the downlink signal to transmit the uplink control signal or the downlink control signal, and outputs the control information to extractor 204.

In addition, controller 209 acquires information on the uplink data transmission of terminal 200 that is respectively obtained from the downlink control signal to be inputted from decoder 206 or the uplink control signal to be inputted from decoder 208. Controller 209 calculates, for example, the schemes of coding and modulation or the radio resource allocation of the uplink data transmission by using the information on the uplink data transmission, and outputs the calculated information to encoder 210, encoder 212, modulator 211, modulator 213, and signal assigner 214.

Further, controller 209 outputs the information on the DMRS setting obtained from the uplink control signal or the downlink control signal to signal assigner 214.

Furthermore, controller 209 determines, in a method described later, the eMBB transmission operation in URLLC-transmission-interrupted and subsequent symbols, the multiple position of URLLC transmission, or the like in the case of eMBB transmission and URLLC transmission simultaneously occurring, and outputs the determined information to transmitter 216.

Encoder 210 applies error correction coding to a transmission bit sequence (i.e., transmission data) corresponding to eMBB, and outputs the bit sequence after the coding to modulator 211.

Modulator 211 generates a modulation symbol sequence by modulating the bit sequence to be inputted from encoder 210, and outputs to signal assigner 214.

Encoder 212 applies error correction coding to a transmission bit sequence (i.e., transmission data) corresponding to URLLC, and outputs the bit sequence after the coding to modulator 213.

Modulator 213 generates a modulation symbol sequence by modulating the bit sequence to be inputted from encoder 212, and outputs to signal assigner 214.

Signal assigner 214 maps the signal to be inputted from modulator 211 or modulator 213 to the radio resource to be indicated by controller 209. Additionally, signal assigner 214 maps DMRS to the radio resource based on the information on the DMRS setting to be inputted from controller 209. Signal assigner 214 outputs the uplink signal with the signals have been mapped thereto to IFFT 215.

IFFT 215 applies transmission waveform generation processing such as OFDM to the signal to be inputted from signal assigner 214. IFFT 215 outputs the generated transmission waveform to transmitter 216. IFFT 215 applies Cyclic Prefix (CP) in an OFDM transmission applying CP (not illustrated). Alternatively, the modulation symbol sequence to be outputted from modulator 211 and modulator 213 may be converted into a symbol sequence in a frequency domain by applying Discrete Fourier Transform (DFT) when IFFT 215 generates a single-carrier waveform (e.g., a DFT-s-OFDM waveform) (not illustrated).

Transmitter 216 performs transmission control (e.g., transmission multiplexing, eMBB transmission cancelation, transmission power control, etc.) on eMBB transmission and URLLC transmission, towards the signal to be inputted from IFFT 215 based on the information to be inputted from controller 209. In addition, transmitter 216 applies Radio Frequency (RF) processing such as Digital-to-Analog (D/A) conversion and up-conversion to the signal, and transmits the radio signal to base station 100 via antenna 201.

[Operations of Base Station 100 and Terminal 200]

Next, operations of base station 100 and terminal 200 that include above-mentioned configurations will be described in detail.

Figure 9:
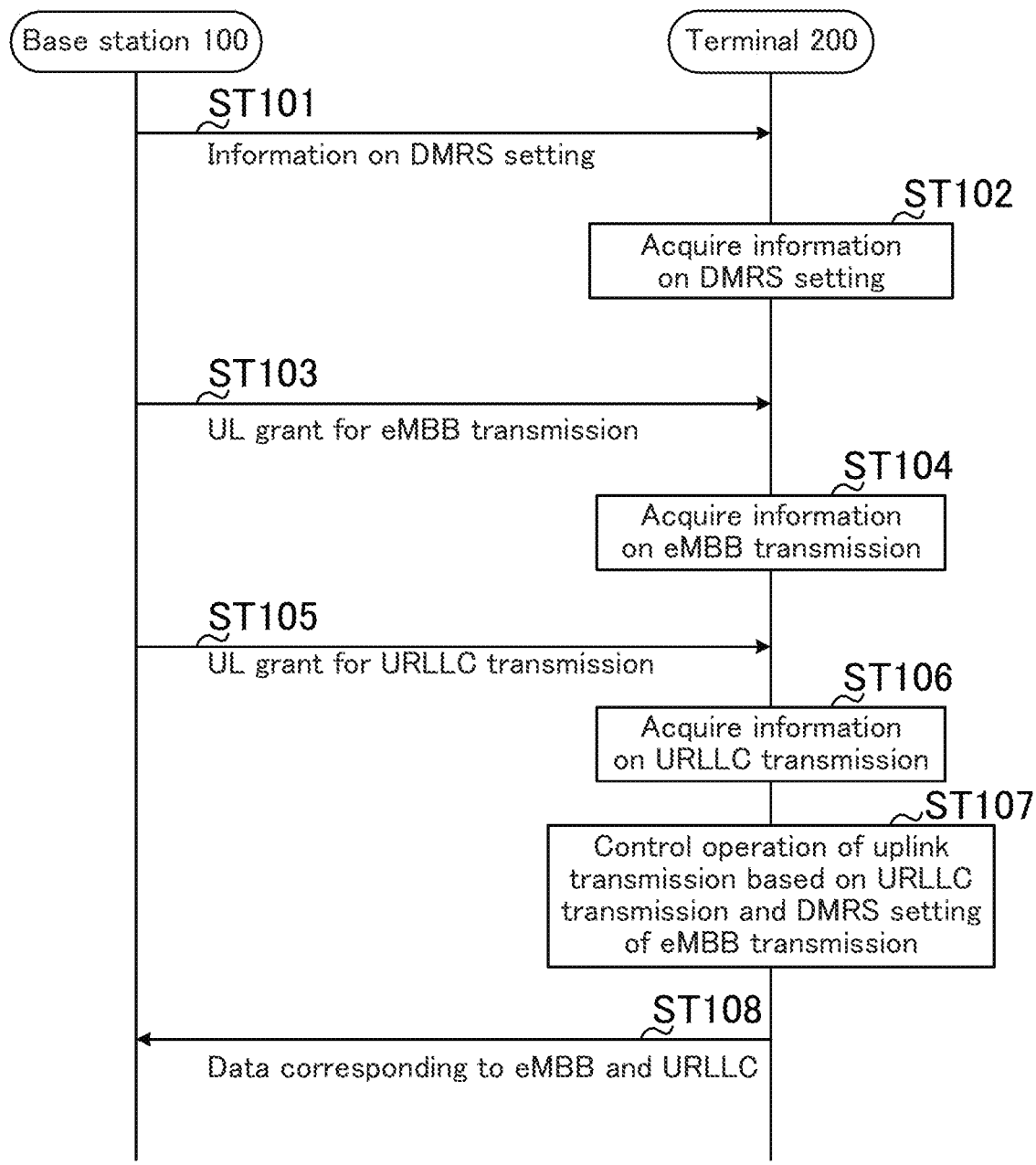
FIG. 9 is a sequence diagram illustrating processes in the base station and the terminal according to Embodiment 1.

FIG. 9 illustrates the flow of processes in base station 100 and terminal 200 according to the present embodiment.

Base station 100 transmits information on a DMRS setting to terminal 200 (ST101). Terminal 200 acquires the information on the DMRS setting indicated from base station 100 (ST102).

Figure 10:
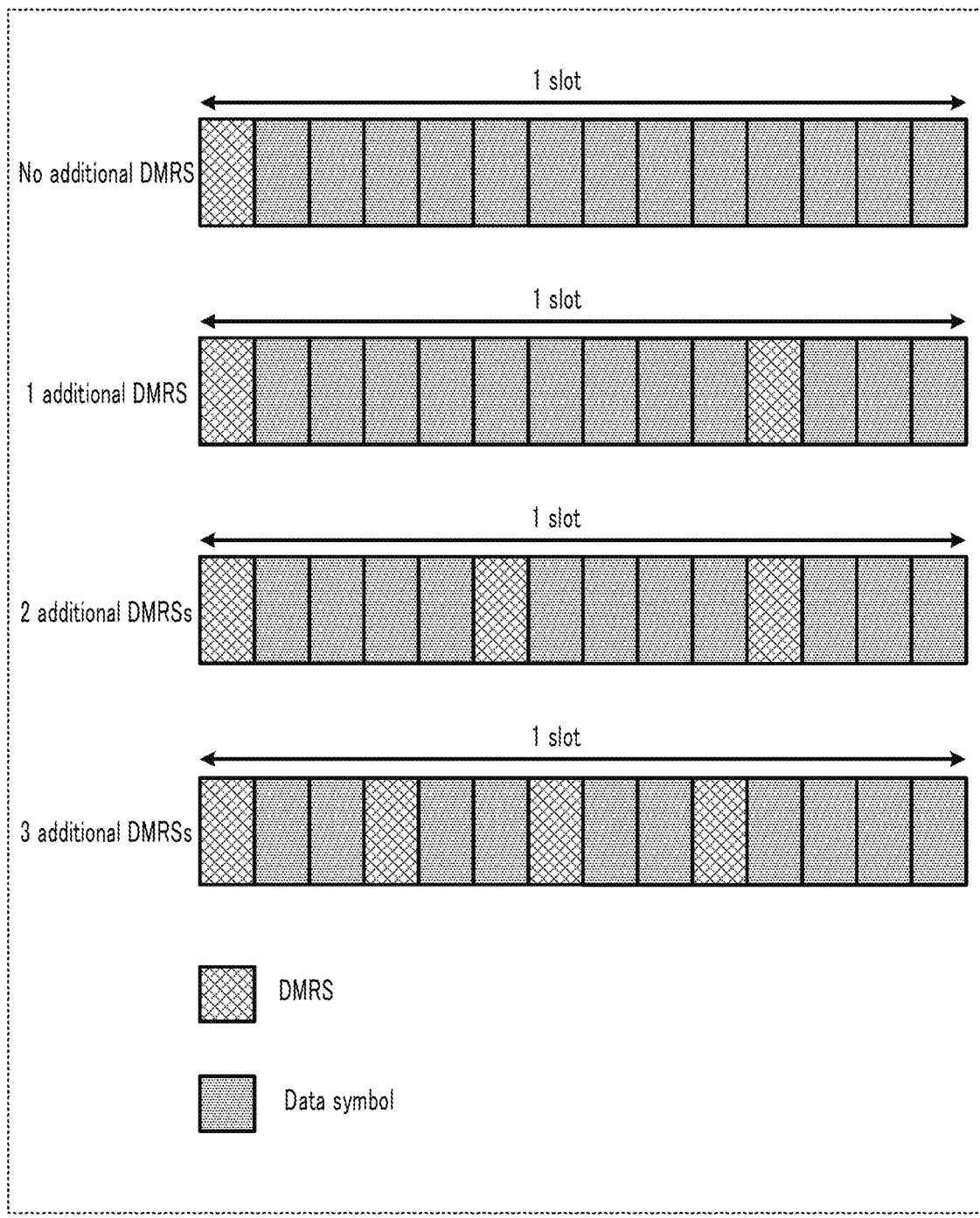
FIG. 10 is a diagram illustrating setting examples of Additional DMRSs.

NR supports, for example, the setting of Additional DMRS(s) as the DMRS setting (see, for example, NPL 1). For example, as illustrated in FIG. 10, when the number of transmission symbols is 14 and the mapping method is "PUSCH mapping type B" where the first one symbol is DMRS, the setting using 1, 2 or 3 symbols of Additional DMRS is supported. The information on the DMRS setting may include, for example, the number of DMRS (e.g., the number of Additional DMRS), the position of DMRS, the mapping method, and the like.

In FIG. 9, base station 100 transmits, for example, a UL grant indicating information on eMBB transmission to terminal 200 (ST103). Terminal 200 acquires the information on eMBB transmission by receiving the UL grant from base station 100 (ST104).

Base station 100 transmits, for example, a UL grant indicating information on URLLC transmission to terminal 200 (ST105). Terminal 200 acquires the information on URLLC transmission by receiving the UL grant from base station 100 (ST106).

Terminal 200 controls the operation of uplink transmission based on the information on the DMRS setting, the information on eMBB transmission, and the information on URLLC transmission (ST107). Terminal 200, for example, may determine the transmission operation of uplink signals (i.e., URLLC transmission and eMBB transmission) based on URLLC transmission and the DMRS setting of eMBB transmission (e.g., the presence or absence of DMRS or the position of DMRS).

Terminal 200 transmits the uplink signal (e.g., data) including at least URLLC transmission to base station 100 in accordance with the determined transmission operation (ST108).

An example of processes in base station 100 and terminal 200 have been described, thus far.

Next, a control method (e.g., a process in ST107 illustrated in FIG. 9) of the operation of uplink transmission in terminal 200 according to the present embodiment will be described in detail.

The present embodiment focuses on a point that NR supports a setting of Additional DMRS as illustrated in FIG. 10.

Base station 100 controls the operation of terminal 200 on uplink transmission based on the presence or absence of DMRS included in each of eMBB transmission and URLLC transmission and the positional relation.

For example, terminal 200 cancels eMBB transmission in URLLC-transmission-interrupted and subsequent symbols in uplink when eMBB transmission and URLLC transmission simultaneously occur and no DMRS is included in URLLC-transmission-interrupted or subsequent symbols in eMBB transmission.

In contrast, terminal 200 discards eMBB transmission in a section overlapped in time with a URLLC transmission position (e.g., a transmission symbol) in uplink when eMBB transmission and URLLC transmission simultaneously occur and DMRS is included in URLLC-transmission-interrupted or subsequent symbols in eMBB transmission. In other words, terminal 200 performs eMBB transmission in sections other than the section overlapped in time with the URLLC transmission section in the eMBB transmission section.

Figure 11A:
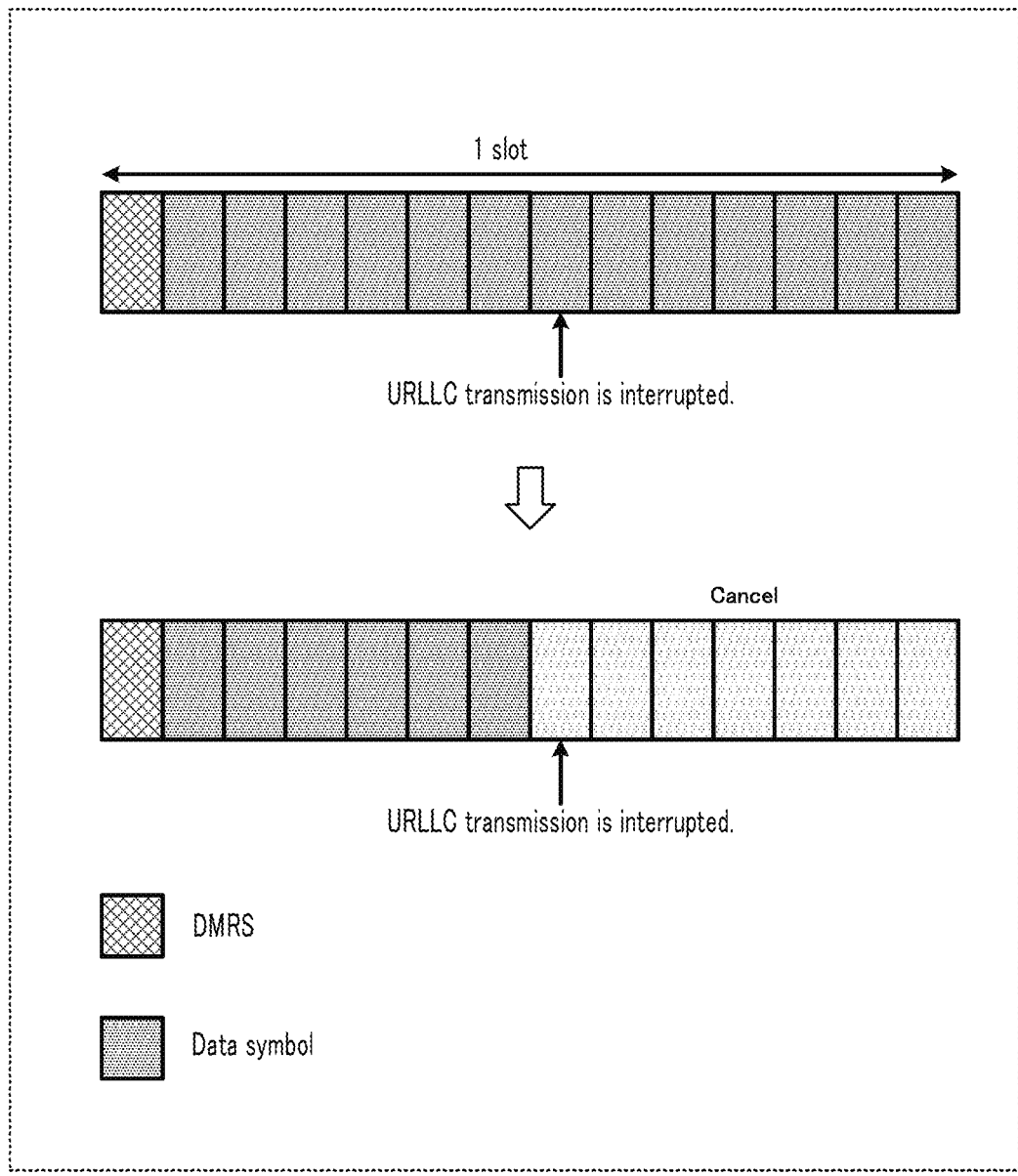
FIG. 11A is a diagram illustrating an exemplary uplink transmission according to Embodiment 1.
Figure 11B:
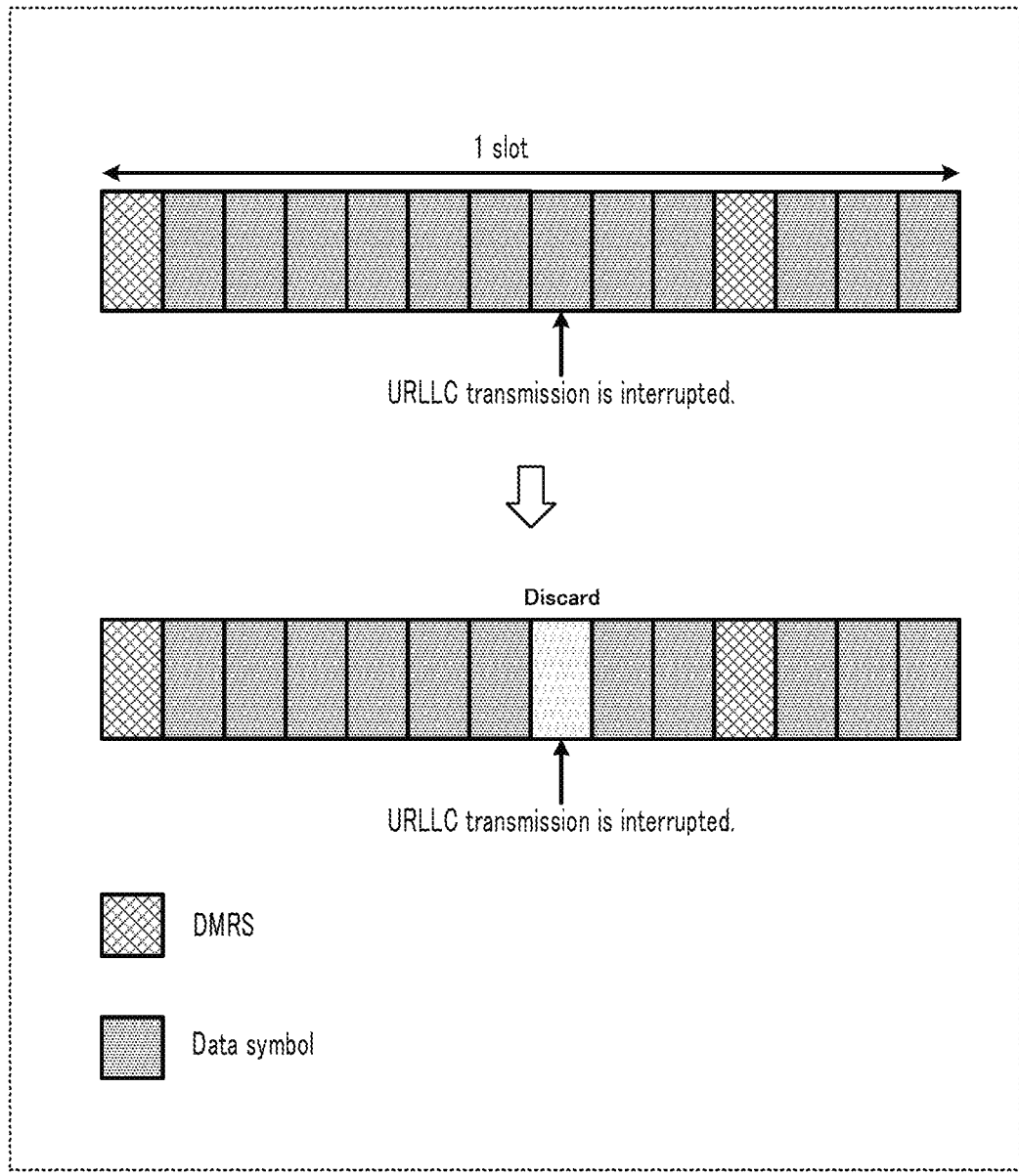
FIG. 11B is a diagram illustrating a transmission example according to Embodiment 1.

FIGS. 11A and 11B illustrate examples of uplink transmissions according to the present embodiment. There are eMBB transmission in a slot unit and URLLC transmission in a symbol unit (e.g., the 8th symbol) occurring in the slots illustrated in FIGS. 11A and 11B. In addition, DMRS is mapped to the head of the slot (i.e., the first symbol) in FIG. 11A, and DMRS is mapped to the first symbol and the 11th symbol of the slot in FIG. 11B.

In the slot illustrated in FIG. 11A, no DMRS is included in the 8th symbol, which is a URLLC transmission section, or the subsequent symbols. Terminal 200 thus cancels eMBB transmission in the 8th and subsequent symbols (e.g., transmission from the 8th to 14th symbols) illustrated in FIG. 11A. That is, terminal 200 performs eMBB transmission from the 1st symbol to the 7th symbol, and performs URLLC transmission in the 8th symbol in FIG. 11A.

In the slot illustrated in FIG. 11B in contrast, DMRS is included in the 11th symbol after the 8th symbol, which is a URLLC transmission section. Terminal 200 thus discards eMBB transmission in the 8th symbol illustrated in FIG. 11B, and performs eMBB transmission in the sections other than the 8th symbol (e.g., from the 9th symbol to the 14th symbol). That is, terminal 200 performs eMBB transmission from the 1st symbol to the 7th symbol and from 9th symbol to 14th symbol, and performs URLLC transmission in the 8th symbol in FIG. 11B.

As illustrated in FIGS. 11A and 11B, terminal 200 prioritizes URLLC transmission and cancels eMBB transmission in a URLLC transmission section when eMBB transmission and URLLC transmission simultaneously occur in uplink transmission. In other words, an uplink signal to be transmitted from terminal 200 includes at least a signal of URLLC transmission. As described above, URLLC transmission is prioritized over eMBB transmission, thereby ensuring the URLLC requirements.

Incidentally, as described with reference to FIG. 5, there is a possibility to cause phase discontinuity in an eMBB transmission signal due to URLLC transmission performing in a part of the eMBB transmission section.

In this regard, terminal 200 in the present embodiment cancels eMBB transmission in the URLLC transmission section and the subsequent section when no DMRS is included in the URLLC transmission section or the subsequent section in the eMBB transmission section (for example, see FIG. 11A). This allows base station 100 to demodulate the data symbols of eMBB in the section where the phase discontinuity of the transmission signals does not occur between DMRS and the data symbols (e.g., the section from the 1st symbol to the 7th symbol in FIG. 11A) even though the phase discontinuity occurs in the signal of eMBB transmission. In contrast, the eMBB transmission is canceled in the section where base station 100 cannot demodulate the data symbols due to the phase discontinuity of the transmission signals between DMRS and the data symbols (e.g., the section from the 9th symbol to the 14th symbol in FIG. 11A) even when the phase discontinuity occurs in the signal of the eMBB transmission, thereby preventing the deterioration of the transmission quality of eMBB in base station 100.

Further, terminal 200 in the present embodiment performs eMBB transmission in the section other than the URLLC transmission section when DMRS is included in the URLLC transmission section or the subsequent section in the eMBB transmission section (for example, see FIG. 11B). This causes a section where no phase discontinuity of the transmission signals occurs between DMRS and the data symbols in the URLLC transmission section and the subsequent section (e.g., the section from the 9th symbol to the 14th symbol in FIG. 11B) even though the phase discontinuity occurs in the signal of eMBB transmission due to URLLC transmission. This possibly enables base station 100 to demodulate eMBB data symbols in URLLC-transmission-interrupted and subsequent symbols with a channel estimate using DMRS in the section where no phase discontinuity of the transmission signals occurs. It is thus possible to suppress the deterioration of the frequency utilization efficiency compared with the case of canceling eMBB transmission in URLLC-transmission-interrupted and subsequent symbols.

As described above, according to the present embodiment, it is possible to suppress the deterioration of eMBB transmission quality or frequency utilization efficiency while ensuring the requirements of URLLC even when eMBB transmission and URLLC transmission simultaneously occur in uplink. Thus, the present embodiment enables one or a plurality of terminals 200 to efficiently transmit data of different services.

Further, in the present embodiment, the operation of eMBB transmission in URLLC-transmission-interrupted and subsequent symbols (e.g., FIG. 11A or 11B) is determined based on the information on URLLC transmission (e.g., the UL grant for URLLC) and the information on eMBB transmission (e.g., the DMRS setting). In other words, no explicit signaling to direct the operation of eMBB transmission in URLLC-transmission-interrupted and subsequent symbols is required. Thus, the present embodiment makes it possible to prevent the signaling overhead from increasing when the operation of eMBB transmission in URLLC-transmission-interrupted and subsequent symbols is controlled.

Furthermore, in the present embodiment, terminal 200 determines the transmission operation of the uplink signal according to URLLC transmission and the DMRS setting of eMBB transmission. In other words, URLLC transmission is prioritized over eMBB transmission regardless of the DMRS setting of eMBB transmission. Thus, the present embodiment does not restrict the scheduling of URLLC transmission.

Embodiment 2

A base station and a terminal according to the present embodiment have the same basic configuration as base station 100 and terminal 200 according to Embodiment 1, and thus FIGS. 7 and 8 will be used for explanation.

As described above, the loss of DMRS causes the deterioration of the transmission quality due to the deterioration of the channel estimation accuracy on the receiving side. Because of this, it is preferable to avoid a lack of DMRS transmission (i.e., the loss of DMRS) as much as possible.

Accordingly, in the present embodiment, terminal 200 shifts a URLLC transmission section in time to a section other than the section overlapping with DMRS of eMBB transmission when URLLC transmission and eMBB transmission simultaneously occur and DMRS is included in the section overlapping with the URLLC transmission section in an eMBB transmission section.

For example, the symbol number of consecutive DMRSs that NR supports is 1 or 2 symbols. In this case, the shift amount of URLLC transmission is 1 or 2 symbols. The symbol number of DMRSs and the shift amount of URLLC transmission, however, are not limited to 1 or 2 symbols, and may be, for example, 3 or more symbols.

Terminal 200 determines the shift of URLLC transmission, and then determines the transmission operation in URLLC-transmission-interrupted and subsequent symbols by any one of the following methods of Option 1 to 3. For example, terminal 200 may determine the operation of eMBB transmission in URLLC-transmission-interrupted and subsequent symbols based on the position of the shifted URLLC transmission and the DMRS setting (e.g., the presence or absence of DMRS or the position thereof) of eMBB transmission.

[Option 1]

Figure 12:
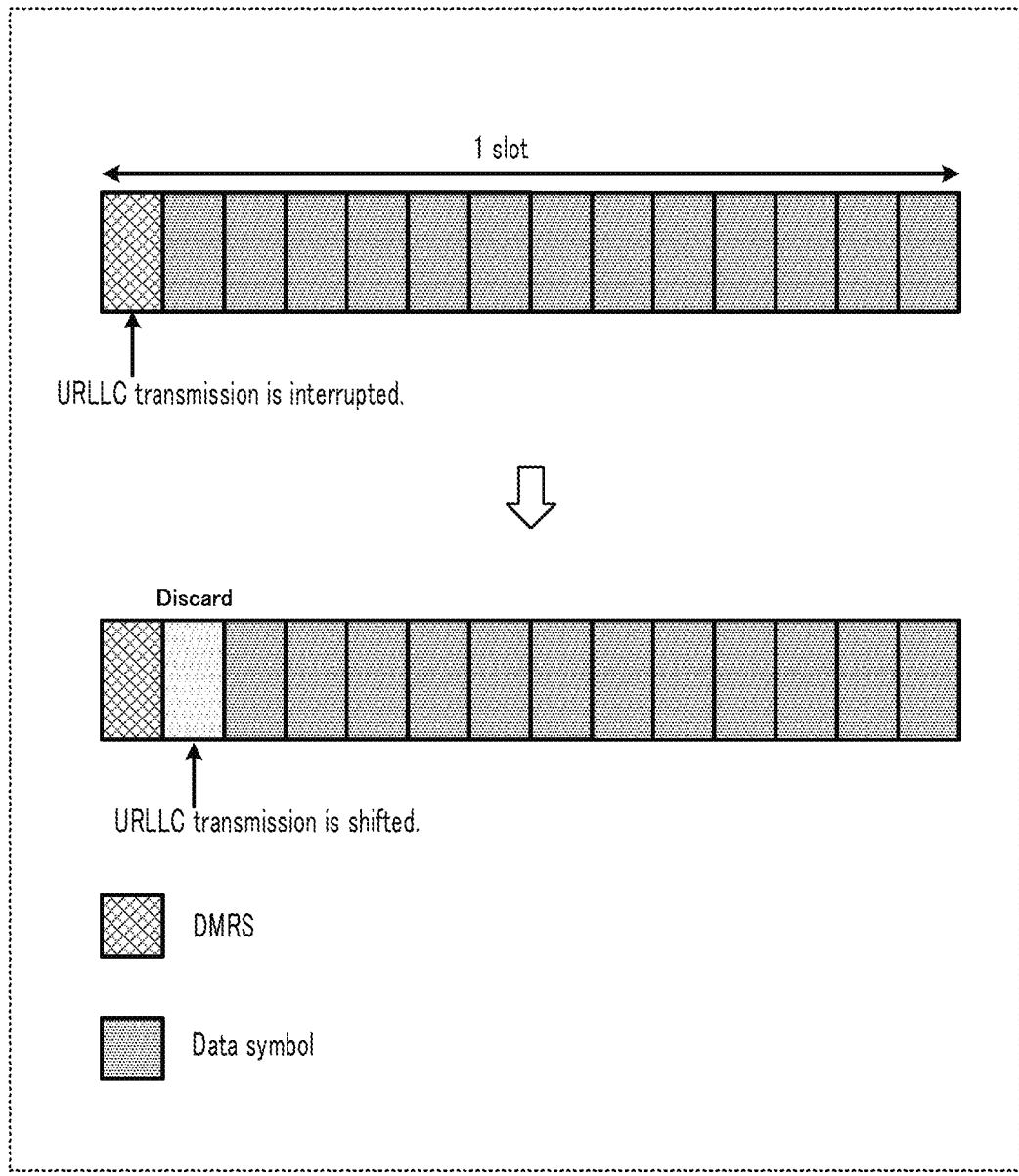
FIG. 12 is a diagram illustrating an exemplary uplink transmission according to Option 1 of Embodiment 2.

In Option 1, terminal 200 discards eMBB transmission, as illustrated in FIG. 12, in the section overlapped in time with the shifted URLLC transmission section (e.g., the 2nd symbol) in the eMBB transmission section. In other words, terminal 200 performs eMBB transmission in the sections other than the section overlapped in time with the shifted URLLC transmission section in the eMBB transmission section, as illustrated in FIG. 12.

In the method of Option 1, URLLC transmission does not cause a loss of DMRS of eMBB transmission. Base station 100 can thus demodulate the data symbols after URLLC transmission (e.g., the 3rd and subsequent symbols in FIG. 12) by using the DMRS prior to URLLC transmission (e.g., the 1st symbol in FIG. 12) in eMBB transmission when, for example, no phase discontinuity of a transmission signal occurs in the part where no eMBB transmission is performed (e.g., the 2nd symbol in FIG. 12).

In addition, even when DMRS is included in URLLC-transmission-interrupted or subsequent symbols in eMBB transmission and base station 100 (the receiving side) performs channel estimation using a plurality of DMRSs (e.g., channel estimation using filtering), neither of DMRSs is lost due to URLLC transmission, thereby preventing the channel estimation accuracy in base station 100 from significantly deteriorating.

Further, when eMBB transmission and URLLC transmission simultaneously occur in the same terminal 200 and the frequency resources allocated to each of eMBB transmission and URLLC transmission are the same (or partially overlapped), base station 100 and terminal 200 may use the DMRS of eMBB transmission for URLLC transmission. Alternatively, base station 100 and terminal 200 may use the DMRS of URLLC transmission for eMBB transmission.

[Option 2]

Figure 13A:
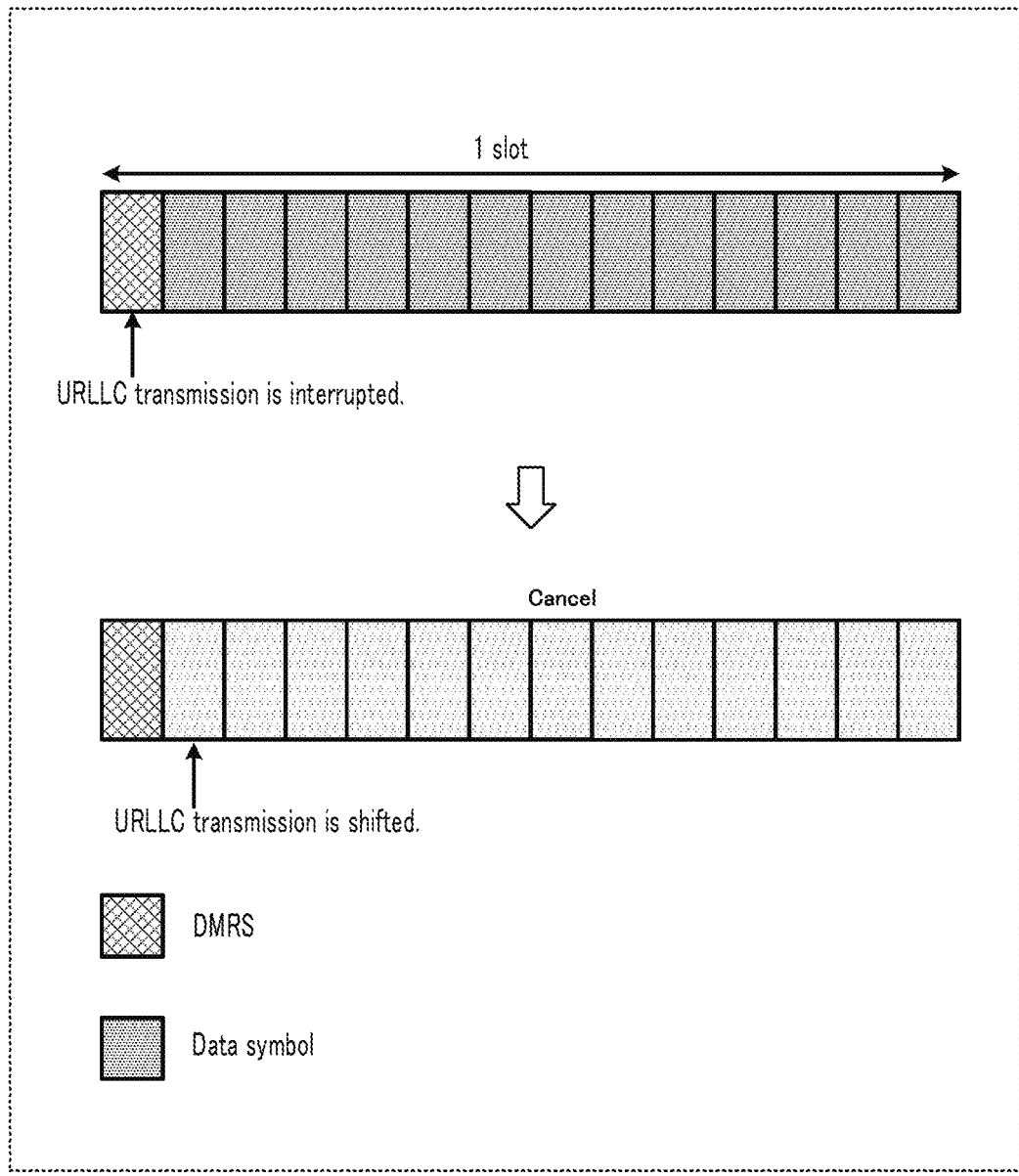
FIG. 13A is a diagram illustrating an exemplary uplink transmission according to Option 2 of Embodiment 2.

Terminal 200, as illustrated in FIG. 13A, cancels eMBB transmission in the shifted URLLC transmission section and the subsequent section when eMBB transmission and URLLC transmission simultaneously occur and no DMRS is included in the shifted URLLC transmission section or the subsequent section in the eMBB transmission section.

Figure 13B:
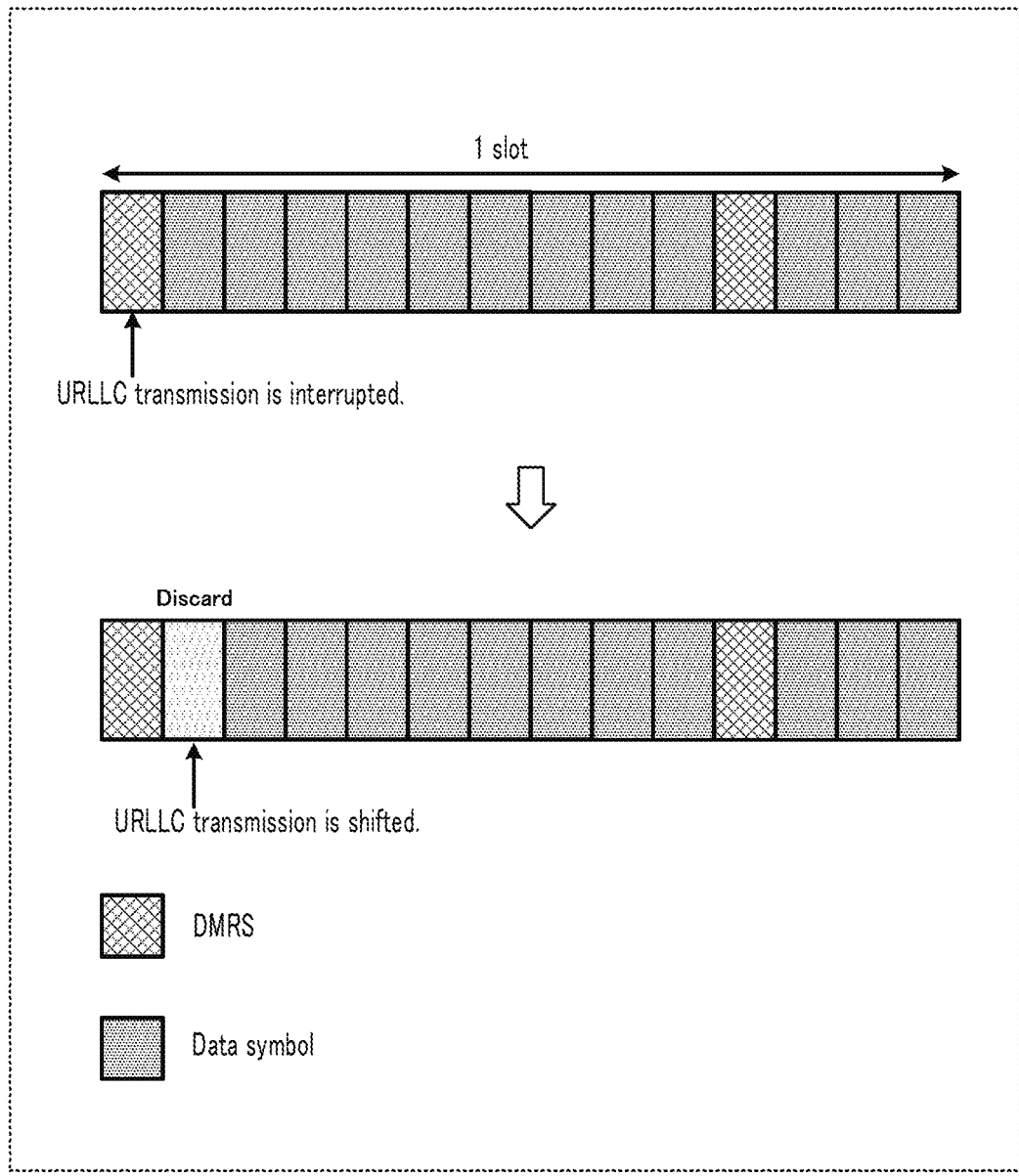
FIG. 13B is a diagram illustrating another exemplary uplink transmission according to Option 2 of Embodiment 2.

In contrast, terminal 200, as illustrated in FIG. 13B, discards eMBB transmission in the section overlapped in time with the URLLC transmission section (e.g., the 2nd symbol in FIG. 13B) when eMBB transmission and URLLC transmission simultaneously occur and DMRS is included in the shifted URLLC transmission section or the subsequent section. In other words, terminal 200 performs eMBB transmission in the sections other than the section overlapped in time with the shifted URLLC transmission section in the eMBB transmission section.

In Option 2, terminal 200 thus cancels eMBB transmission in URLLC-transmission-interrupted and subsequent symbols when URLLC transmission causes the phase discontinuity of eMBB transmission and no DMRS is included in URLLC-transmission-interrupted or subsequent symbols. That is, eMBB transmission is canceled in the section where base station 100 cannot demodulate the data symbols due to the phase discontinuity of the transmission signals between DMRS and the data symbols (e.g., the section from the 3rd symbol to the 14th symbol in FIG. 13A), thereby preventing the deterioration of the transmission quality of eMBB in base station 100.

Further, in Option 2, base station 100 can possibly demodulate eMBB data symbols in URLLC-transmission-interrupted and subsequent symbols with a channel estimate using DMRS in the section where no phase discontinuity of the transmission signals occurs (e.g., the section from the 3rd symbol to the 14th symbol in FIG. 13B) when DMRS is included in URLLC-transmission-interrupted or subsequent symbols. This makes it possible to suppress the deterioration of the frequency utilization efficiency compared with the case of canceling eMBB transmission in URLLC-transmission-interrupted and subsequent symbols.

[Option 3]

In Option 3, terminal 200 cancels eMBB transmission in URLLC-transmission-interrupted and subsequent symbols when no DMRS is included in URLLC-transmission-interrupted or subsequent symbols in eMBB transmission. Terminal 200 also cancels eMBB transmission in URLLC-transmission-interrupted and subsequent symbols when DMRS is included in URLLC-transmission-interrupted or subsequent symbols in eMBB transmission. In other words, terminal 200 cancels eMBB transmission in the shifted URLLC transmission section and the subsequent section in the eMBB transmission section regardless of the presence or absence of DMRS.

DMRS of eMBB transmission does not overlap with URLLC transmission in Option 3, thererby preventing the loss of DMRS in eMBB transmission. This enables base station 100 to prevent the deterioration of the transmission quality due to the deterioration of the channel estimation accuracy.

Figure 14A:
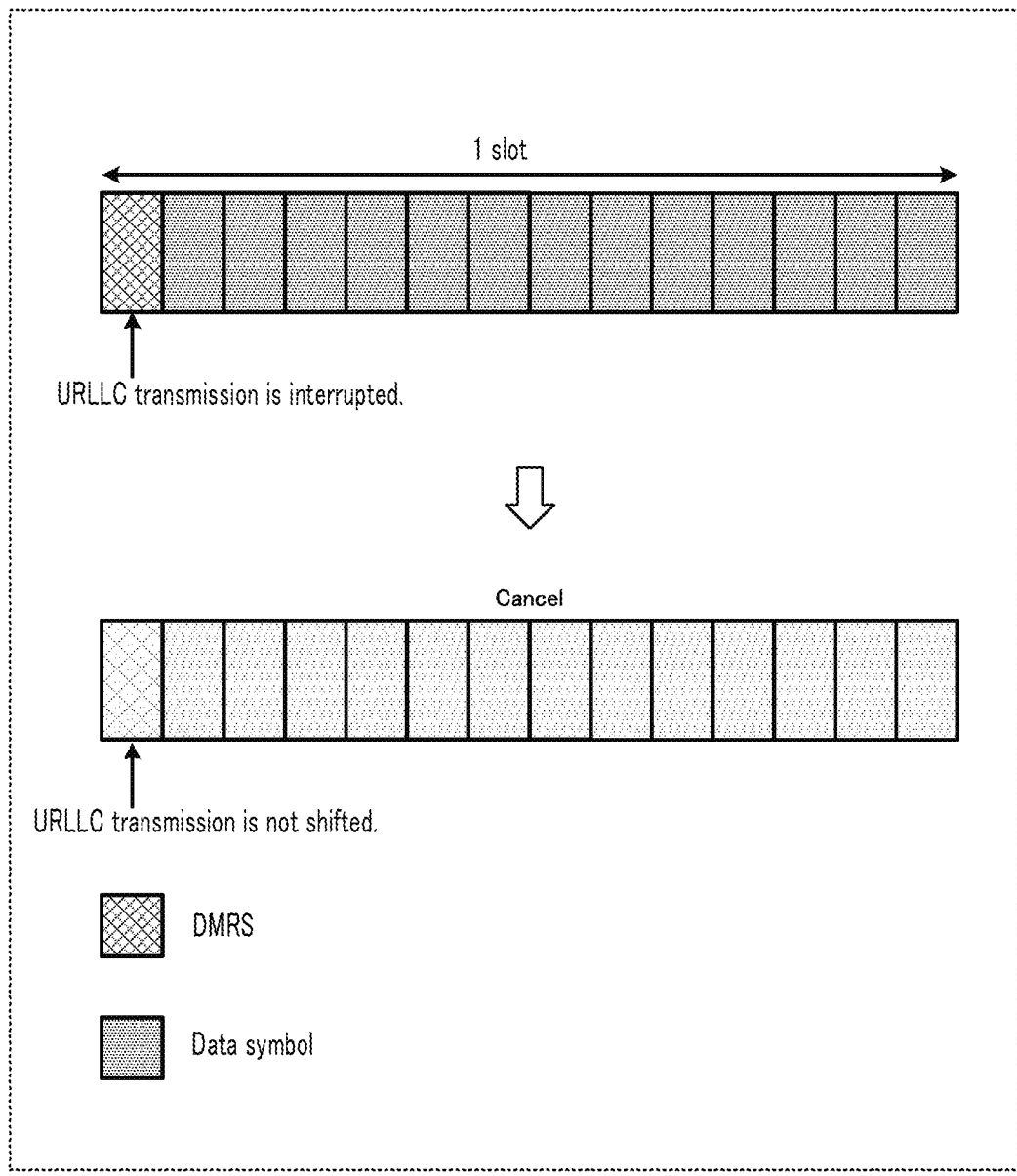
FIG. 14A is a diagram illustrating an exemplary uplink transmission according to Option 3 of Embodiment 2.

Note that, in the method of Option 3, terminal 200 does not have to shift URLLC transmission, as illustrated in FIG. 14A, when the first DMRS of eMBB transmission (e.g., DMRS in the 1st symbol in FIG. 14A) is included in the part that overlaps in time with URLLC transmission before shifting. This is because the data symbols of eMBB transmission in the 3rd and subsequent symbols are canceled even though, for example, URLLC transmission is shifted to the 2nd symbol in FIG. 14A (not illustrated). Terminal 200 can perform URLLC transmission at earlier timing by not shifting URLLC transmission.

Figure 14B:
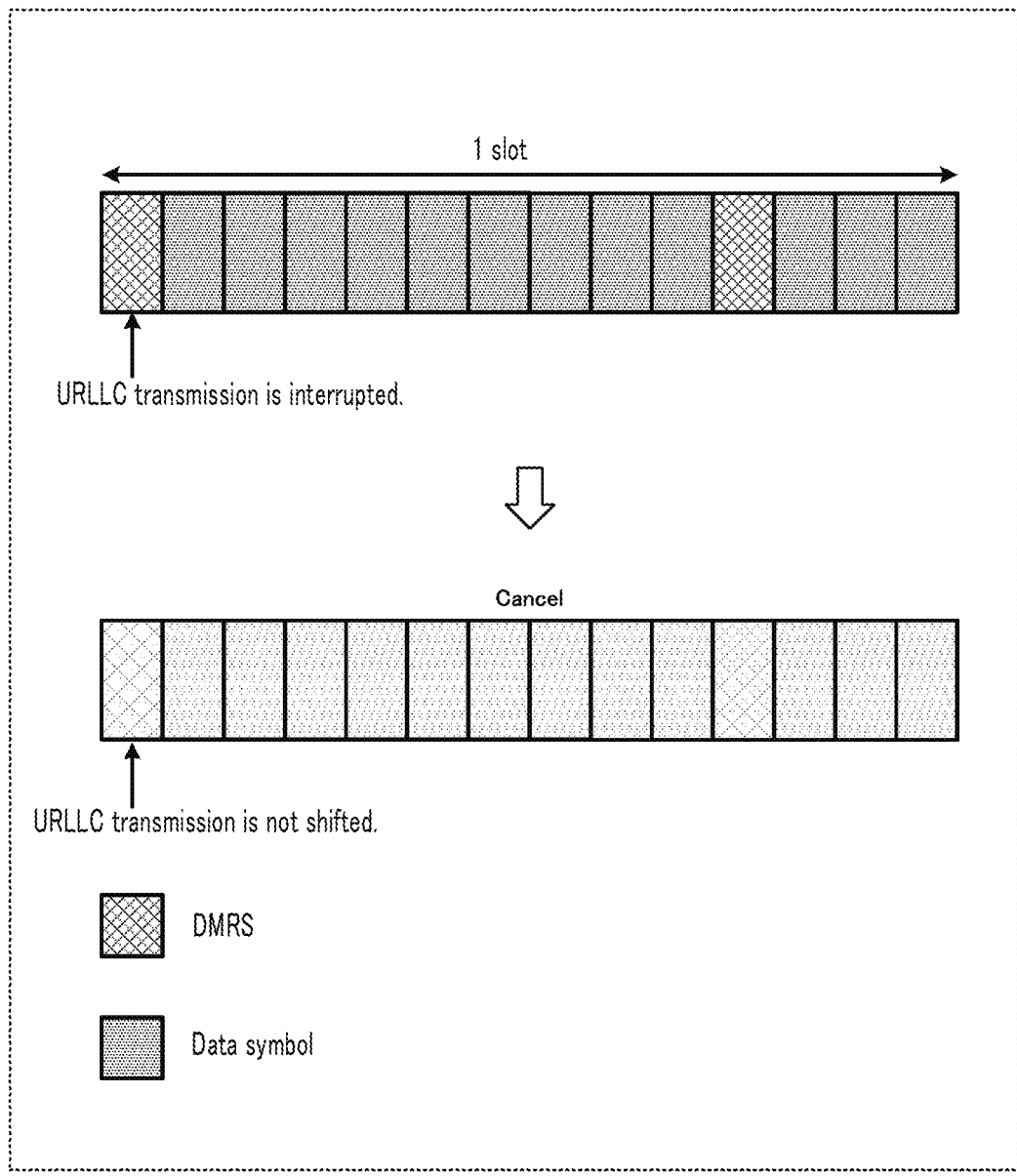
FIG. 14B is a diagram illustrating another exemplary uplink transmission according to Option 3 of Embodiment 2.

In addition, terminal 200 does not have to shift URLLC transmission either, as illustrated in FIG. 14B, when DMRS is included in the symbol to which URLLC transmission is shifted or the subsequent symbols. The phase discontinuity of transmission signals may occur in eMBB transmission when, for example, URLLC transmission is shifted to the 2nd symbol in FIG. 14B (not illustrated).

When the phase discontinuity occurs in eMBB transmission and base station 100 (the receiving side) performs channel estimation using a plurality of DMRSs (e.g., channel estimation using filtering), the channel estimation accuracy is significantly deteriorated due to the phase discontinuity even with the channel estimation using DMRSs before and after URLLC transmission by base station 100. Thus, terminal 200 cancels eMBB transmission, as illustrated in FIG. 14B, even though DMRS is included in URLLC-transmission-interrupted or subsequent symbols because the data symbol demodulation accuracy may be significantly deteriorated in base station 100. Additionally, terminal 200 can perform URLLC transmission at earlier timing by not shifting URLLC transmission.

Figure 14C:
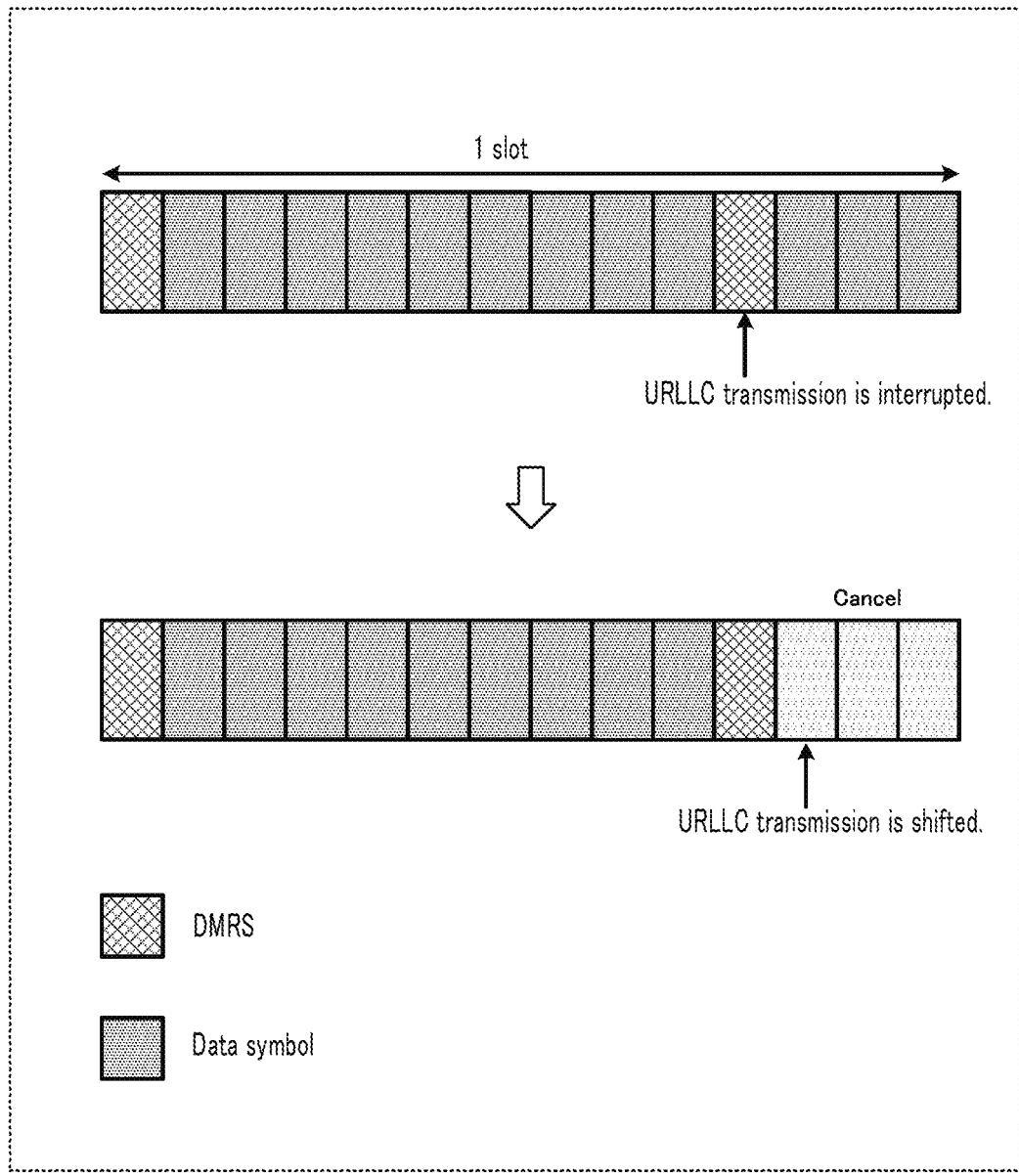
FIG. 14C is a diagram illustrating still another exemplary uplink transmission according to Option 3 of Embodiment 2.

Further, terminal 200 may shift URLLC transmission and cancel eMBB transmission in the symbol where URLLC transmission is shifted and the subsequent symbols, as illustrated in FIG. 14C, when Additional DMRS of eMBB transmission is included in the part that overlaps with URLLC transmission and no DMRS is included in URLLC-transmission-interrupted or subsequent symbols. In the case of setting additional DMRS in eMBB transmission as illustrated in FIG. 14C, no phase discontinuity occurs among a plurality of DMRSs even when terminal 200 avoids the loss of the last DMRS in eMBB transmission (e.g., the 11th symbol in FIG. 14C) by shifting URLLC transmission. This makes it possible to prevent the channel estimation accuracy from deteriorating when, for example, base station 100 (the receiving side) performs channel estimation using the plurality of DMRSs.

Options 1 to 3 have been described, thus far.

Embodiment 3

A base station and a terminal according to the present embodiment have the same basic configuration as base station 100 and terminal 200 according to Embodiment 1, and thus FIGS. 7 and 8 will be used for explanation.

In the present embodiment, a description will be given of a case where DMRS of eMBB transmission is included in a part that overlaps in time with URLLC transmission, and DMRS is included in URLLC-transmission-interrupted or subsequent symbols.

To be more specific, base station 100 notifies terminal 200 of information indicating the operation of either canceling eMBB transmission in a URLLC transmission section and the subsequent section in an eMBB transmission section or performing eMBB transmission in a section other than the URLLC transmission section in the eMBB transmission section (hereinafter, referred to as "information on eMBB transmission in URLLC-transmission-interrupted and subsequent symbols").

For example, information on eMBB transmission in URLLC-transmission-interrupted and subsequent symbols may be transmitted from base station 100 to terminal 200 in ST101 illustrated in FIG. 9, and acquired by terminal 200 in ST102 illustrated in FIG. 9.

Terminal 200 decides whether to cancel eMBB transmission in URLLC-transmission-interrupted and subsequent symbols or to discard eMBB transmission in a section overlapped in time with URLLC transmission on the basis of information on eMBB transmission in URLLC-transmission-interrupted and subsequent symbols notified by base station 100 (the receiving side).

Base station 100, for example, may indicate terminal 200 of information on eMBB transmission in URLLC-transmission-interrupted and subsequent symbols using a cell-specific or UE-specific RRC signal or DCI, taking account of a channel estimation method used for receiving an uplink signal. Hereinafter, an example of a method of notifying information on eMBB transmission in URLLC-transmission-interrupted and subsequent symbols will be described.

Base station 100 can perform channel estimation using a plurality of DMRSs (e.g., channel estimation using filtering) in the case of setting additional DMRS for terminal 200. In the channel estimation using a plurality of DMRSs, the channel estimation accuracy is significantly deteriorated when any of DMRSs out of the plurality of DMRSs is lost, or phase discontinuity occurs among the plurality of DMRSs.

Figure 15A:
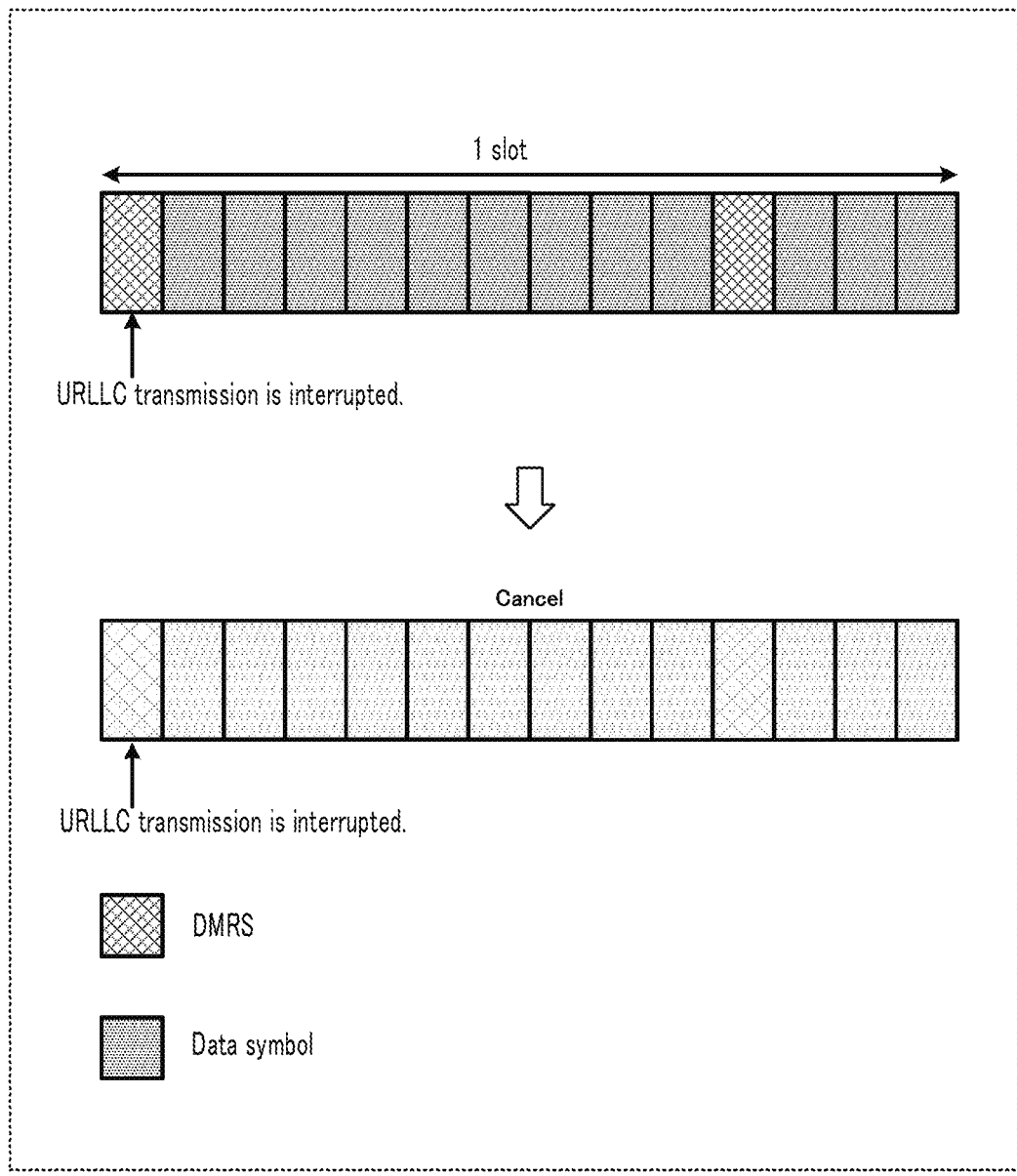
FIG. 15A is a diagram illustrating an exemplary uplink transmission according to Embodiment 3.

Base station 100 thus notifies terminal 200 of canceling eMBB transmission in URLLC-transmission-interrupted and subsequent symbols when base station 100 (the receiving side) performs the channel estimation using a plurality of DMRSs. In this case, terminal 200, for example, cancels eMBB transmission in URLLC-transmission-interrupted and subsequent symbols (e.g., the 1st and subsequent symbols) as illustrated in FIG. 15A.

This makes it possible to prevent the deterioration of the transmission quality due to the deterioration of the channel estimation accuracy because base station 100 does not perform the channel estimation using DMRS when DMRS is lost or the phase discontinuity occurs among DMRSs.

Figure 15B:
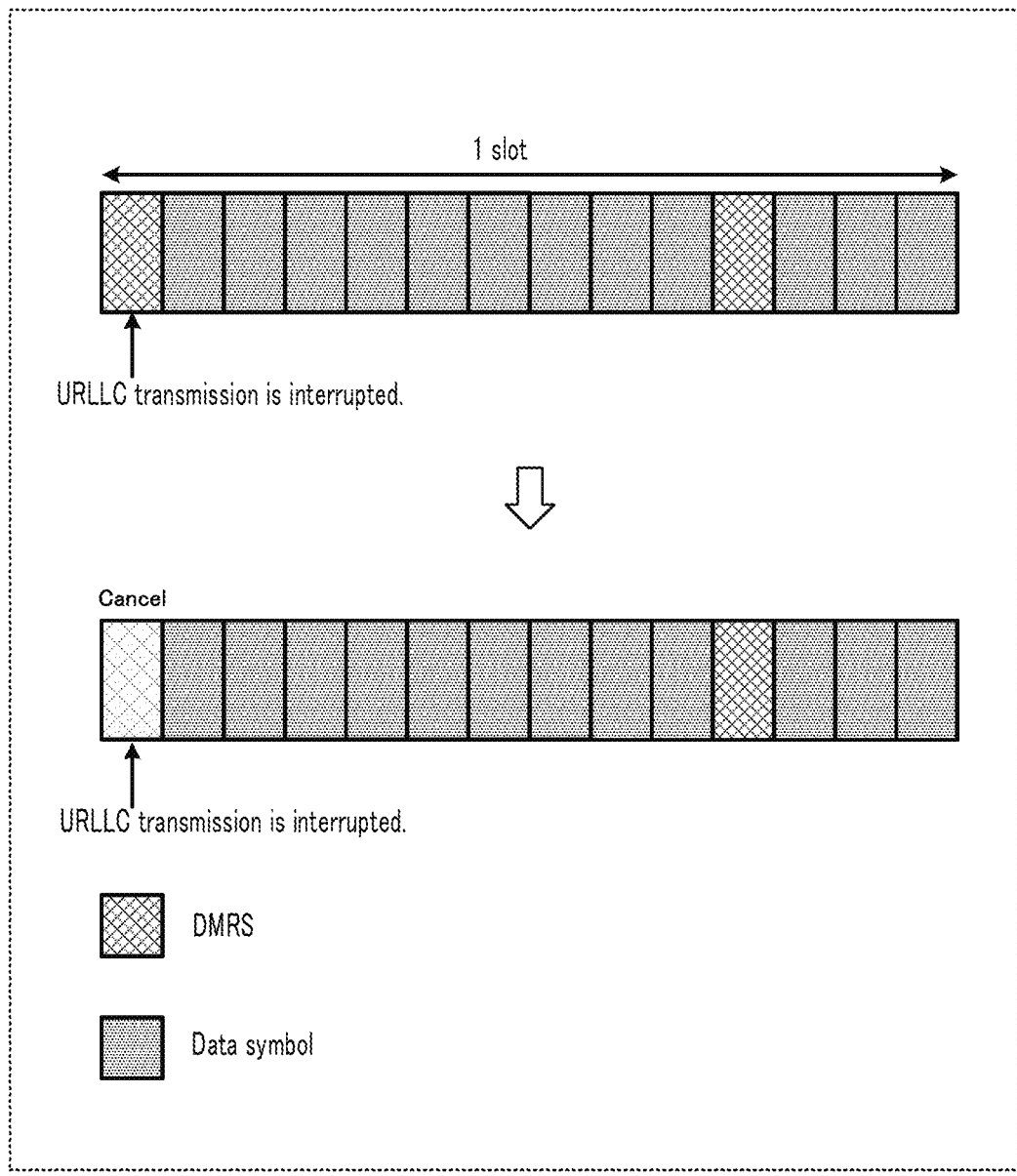
FIG. 15B is a diagram illustrating another exemplary uplink transmission according to Embodiment 3.

In contrast, base station 100 indicates terminal 200 of discarding eMBB transmission in a section overlapped in time with URLLC transmission when base station 100 does not perform the channel estimation using a plurality of DMRSs. In this case, terminal 200, for example, discards eMBB transmission, as illustrated in FIG. 15B, in the section overlapped in time with URLLC transmission (e.g., the 1st symbol), and performs eMBB transmission in the section other than the section overlapped in time with URLLC transmission (e.g., the 2nd and subsequent symbols).

This enables base station 100 to perform channel estimation using the remaining DMRS (e.g., DMRS to be transmitted) before or after URLLC transmission (after URLLC transmission in FIG. 15B) even when any of DMRSs is lost in eMBB transmission. Thus, it is possible to suppress the deterioration of the frequency utilization efficiency compared with the case of canceling eMBB transmission in URLLC-transmission-interrupted and subsequent symbols.

Embodiment 4

A base station and a terminal according to the present embodiment have the same basic configuration as base station 100 and terminal 200 according to Embodiment 1, and thus FIGS. 7 and 8 will be used for explanation.

In the present embodiment, a method for simplifying the operation of terminal 200 will be described.

To be more specific, each time unit (e.g., a symbol in a slot) is associated with either of the operations of canceling eMBB transmission in a URLLC transmission section and the subsequent section in an eMBB transmission section or performing eMBB transmission in a section other than the URLLC transmission section in the eMBB transmission section. The association between the time units and the transmission operations of terminal 200 may be determined based on, for example, URLLC transmission and a DMRS setting of eMBB transmission.

Figure 16:
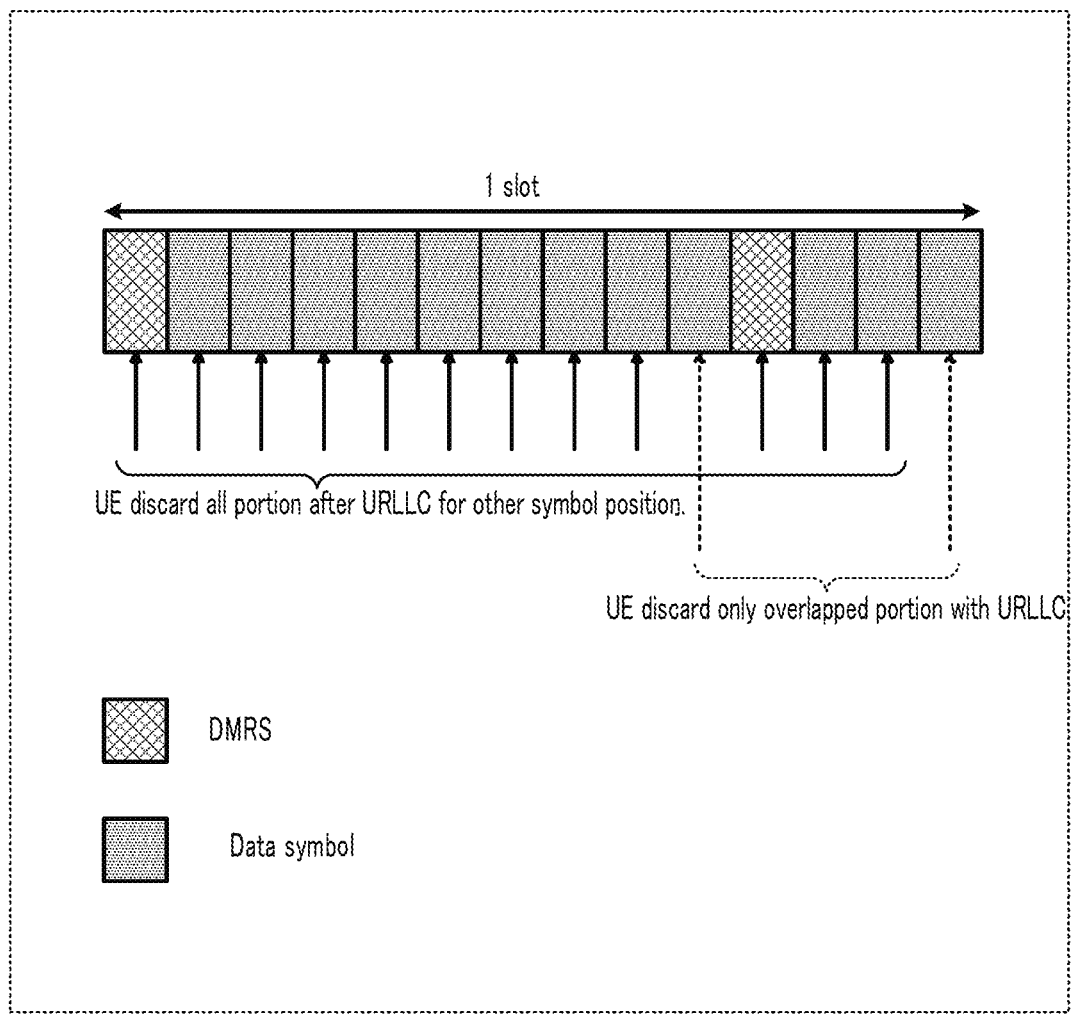
FIG. 16 is a block diagram illustrating association between transmission symbols and transmission operations according to Embodiment 4.

As illustrated in FIG. 16 for example, the process of discarding eMBB transmission in the section overlapped in time with URLLC transmission is associated (the broken arrows illustrated in FIG. 16) with the symbol that is one symbol before DMRS of eMBB transmission (i.e., the 10th symbol in FIG. 16) and the last symbol of eMBB transmission (i.e., the 14th symbol in FIG. 16). Meanwhile, the process of canceling eMBB transmission in URLLC-transmission-interrupted and subsequent symbols is associated (the solid arrows illustrated in FIG. 16) with the symbols other than the symbol that is one symbol before DMRS of eMBB transmission and the last symbol of eMBB transmission.

Note that the last symbol may be considered to be associated with the process of canceling eMBB transmission in URLLC-transmission-interrupted and subsequent symbols because no symbol follows after the last symbol of the 14th symbol in the slot illustrated in FIG. 16.

Terminal 200 determines the operation of eMBB transmission based on the association between the symbols and the transmission operations of terminal 200 (for example, see FIG. 16), for example, according to the symbol where URLLC transmission occurs in the slot.

Figure 17A:
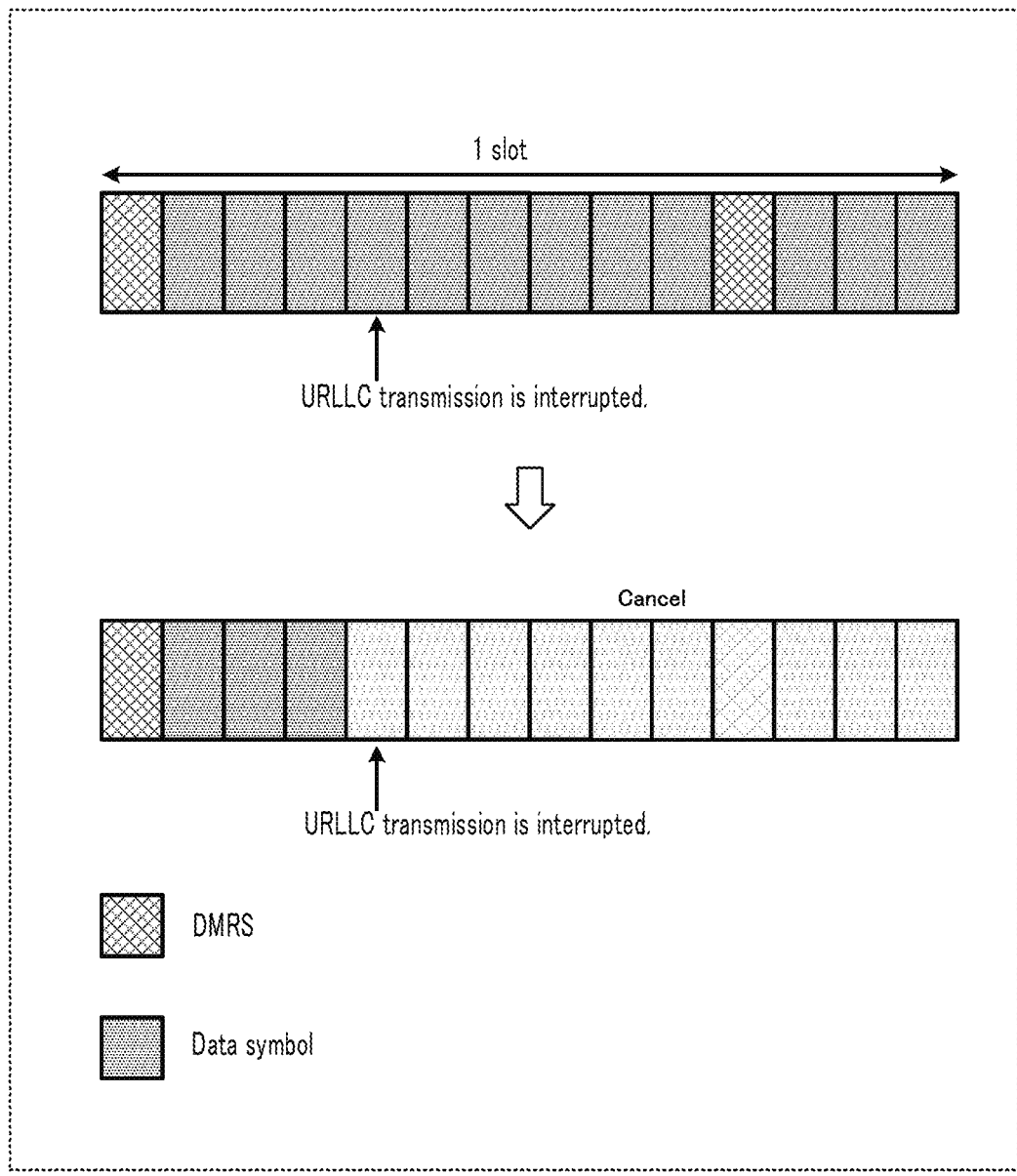
FIG. 17A is a diagram illustrating an exemplary uplink transmission according to Embodiment 4.
Figure 17B:
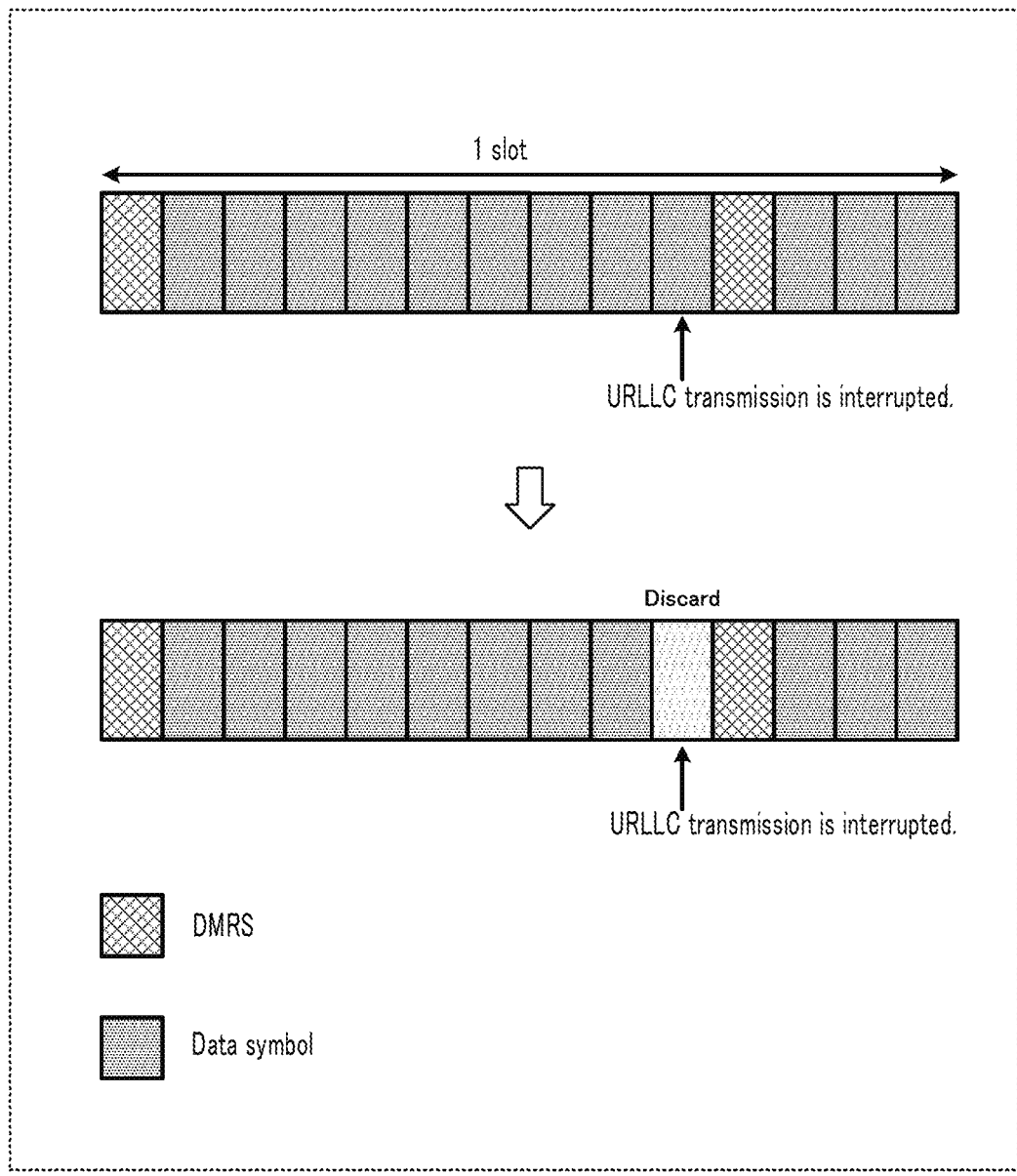
FIG. 17B is a diagram illustrating another exemplary uplink transmission according to Embodiment 4.

FIGS. 17A and 17B illustrate examples of the operations of terminal 200 based on the association between the eMBB transmission processes and the symbols illustrated in FIG. 16.

DMRS is mapped to the 1st symbol and the 11th symbol out of the 14 symbols that form one slot in FIGS. 17A and 17B. Thus, the symbol that is one symbol before DMRS of eMBB transmission is the "10th symbol" and the last symbol of eMBB transmission is the "14th symbol" in FIGS. 17A and 17B.

When URLLC transmission is interrupted in the 5th symbol in the slot where eMBB transmission is performed as illustrated in FIG. 17A, terminal 200 cancels eMBB transmission in URLLC-transmission-interrupted and subsequent symbols (e.g., the 5th and subsequent symbols in FIG. 17A) based on the association illustrated in FIG. 16, for example.

Meanwhile, when URLLC transmission is interrupted in the 10th symbol in the slot where eMBB transmission is performed as illustrated in FIG. 17B, terminal 200 discards eMBB transmission in the section overlapped in time with URLLC transmission. In other words, terminal 200 performs eMBB transmission in the symbols other than the 10th symbol in the slot, illustrated in FIG. 17B, where eMBB transmission is performed.

As described above, in the present embodiment, the operation of either canceling eMBB transmission in URLLC-transmission-interrupted and subsequent symbols or discarding eMBB transmission in the section overlapped in time with URLLC transmission is assigned in advance to each symbol in terminal 200 on the basis of URLLC transmission and the DMRS setting of eMBB transmission. This allows terminal 200 to uniquely determine the operation of eMBB transmission in URLLC-transmission-interrupted and subsequent symbols depending on the symbol where URLLC transmission occurs. Thus, the present embodiment eliminates the need for complicated condition determination to determine the process of terminal 200, and makes it possible to simplify the operation of terminal 200.

Note that, in the present embodiment, the process of discarding eMBB transmission in the section overlapped in time with URLLC transmission is not limited to be associated with the symbol that is one symbol before DMRS of eMBB transmission. For example, the process of discarding eMBB transmission in the section overlapped in time with URLLC transmission may be associated with symbols within a range in which base station 100 (the receiving side) can properly demodulate using DMRS. In FIG. 16, for example, when base station 100 can properly demodulate the data symbol of eMBB transmission in the 9th symbol by using DMRS in the 11th symbol, the process of discarding eMBB transmission in the section overlapped in time with URLLC transmission may be associated with the 8th symbol, which is one symbol before the 9th symbol. Terminal 200 performs eMBB transmission in the 9th and the subsequent symbols when URLLC transmission occurs in the 8th symbol, for example. Even in this case, base station 100 can demodulate the data symbols of eMBB transmission including the data symbol in the 9th symbol by using DMRS in the 11th symbol.

Embodiment 5

A base station and a terminal according to the present embodiment have the same basic configuration as base station 100 and terminal 200 according to Embodiment 1, and thus FIGS. 7 and 8 will be used for explanation.

In the present embodiment, terminal 200 changes the setting of DMRS in eMBB transmission based on the presence or absence of URLLC transmission. Alternatively, terminal 200 sets Additional DMRS in eMBB transmission based on the presence or absence of URLLC transmission.

Figure 18:
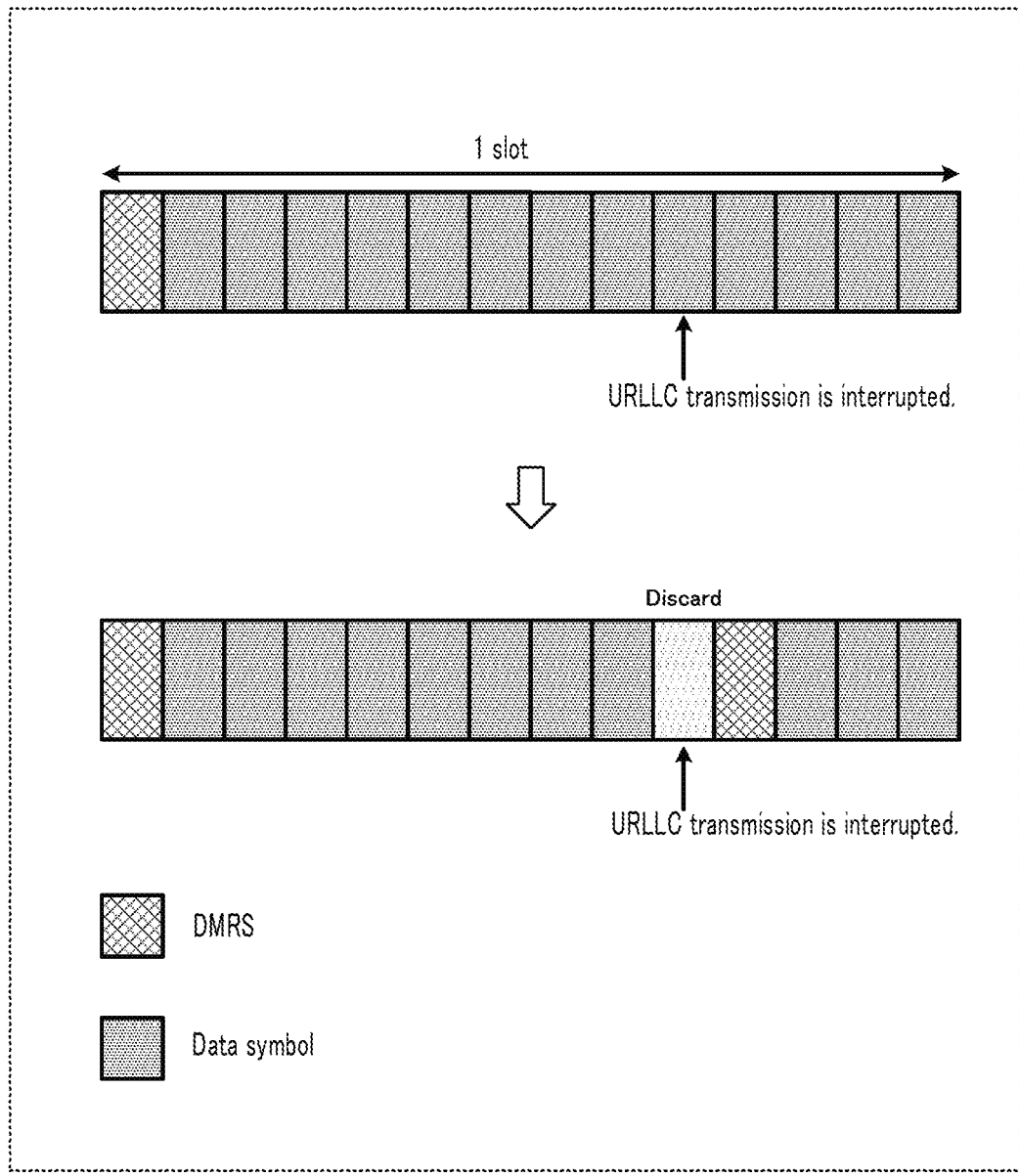
FIG. 18 is a diagram illustrating an exemplary uplink transmission according to Embodiment 5.

For example, terminal 200 discards eMBB transmission in a section overlapped with a URLLC transmission section when eMBB transmission and URLLC transmission simultaneously occur in uplink, as illustrated in FIG. 18.

In addition, terminal 200 changes the DMRS setting so that Additional DMRS is transmitted in URLLC-transmission-interrupted or subsequent symbols, as illustrated in FIG. 18, when no DMRS is included in URLLC-transmission-interrupted or subsequent symbols (e.g., the 10th and subsequent symbols in FIG. 18) in eMBB transmission. Terminal 200, for example, sets additional DMRS in the symbol immediately after URLLC transmission (URLLC transmission occurs in the 11th symbol and additional DMRS is set in the 10th symbol in FIG. 18).

As described above, in the present embodiment, terminal 200 newly sets DMRS after the URLLC transmission section in the eMBB transmission section when no DMRS is included in the URLLC transmission section or the subsequent section in the eMBB transmission section. This enables to transmit DMRS in URLLC-transmission-interrupted or subsequent symbols in eMBB transmission, and thereby terminal 200 can perform eMBB transmission even in URLLC-transmission-interrupted and subsequent symbols. Thus, the present embodiment makes it possible to suppress the deterioration of the frequency utilization efficiency compared with the case of canceling eMBB transmission.

Each embodiment of the present disclosure has been described, thus far.

The transmission in a slot unit described above can be replaced with "PUSCH mapping type A" and the transmission not in a slot unit can be replaced with "PUSCH mapping type B". In addition, eMBB is not limited to be the transmission in a slot unit, but may be the transmission not in a slot unit.

Further, an embodiment of the present disclosure is not limited to eMBB transmission and URLLC transmission, and may be applied to services other than eMBB and URLLC. For example, eMBB transmission may be replaced with PUSCH mapping type A and URLLC transmission may be replaced with PUSCH mapping type B. Additionally, eMBB transmission may be replaced with a transmission with a long transmission section (e.g., in a slot length or a symbol length), for example, and URLLC transmission may be replaced with a transmission with a shorter transmission section than the transmission section described above.

Further, the above-mentioned embodiment has described the slot composed of 14 symbols, but the number of symbols forming a slot is not limited to 14, and may be other numbers.

(Variation 1)

As described above, one aspect of the present disclosure is applicable to the two cases: the case where eMBB transmission and URLLC transmission simultaneously occur in a certain terminal 200 (i.e., "Intra-UL multiplexing"), and the case where eMBB transmission and URLLC transmission simultaneously occur between different terminals 200 in a cell, and the frequency resources allocated to each of terminals 200 are the same or partially overlapped (i.e., "Inter-UE multiplexing").

In Intra-UE multiplexing, terminal 200 can recognize that URLLC transmission occurs simultaneously with eMBB transmission by a UL grant that schedules URLLC transmission (or a UL grant after a UL grant for eMBB transmission) (see, for example, FIG. 9).

Figure 19:
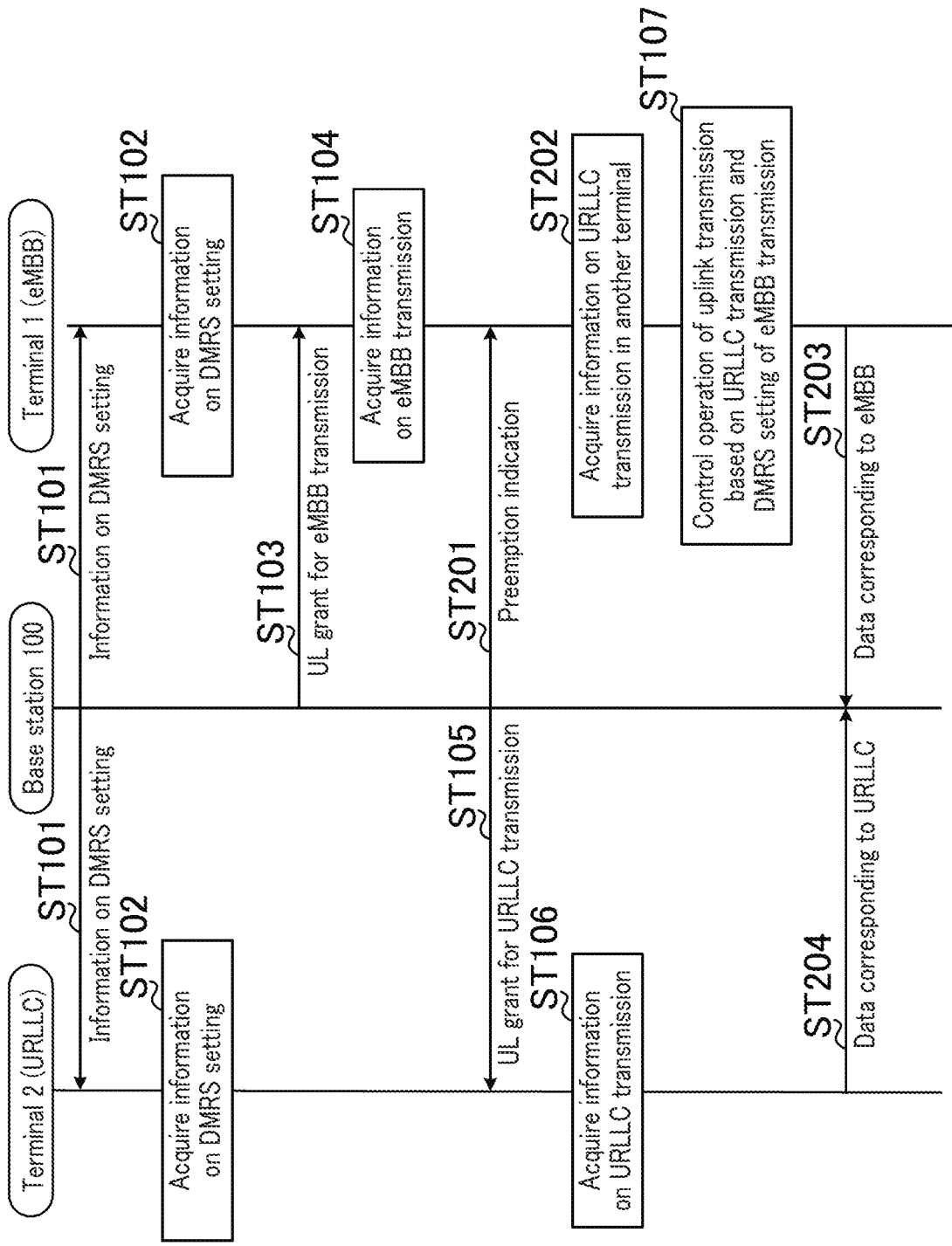
FIG. 19 is a sequence diagram illustrating processes in the base station and the terminal in Inter-UE multiplexing.

In Inter-UE multiplexing, base station 100 and a plurality of terminals 200 (e.g., terminal 1 and terminal 2), for example, proceed the process illustrated in FIG. 19. Note that, in the flow of the processing illustrated in FIG. 19, the same processing as the processing illustrated in FIG. 9 is denoted by the same reference signs, and the explanation thereof is omitted.

In Inter-UE multiplexing, base station 100 transmits a UL grant for eMBB transmission to terminal 1 that performs eMBB transmission (ST103), and transmits a UL grant for URLLC transmission to terminal 2 that performs URLLC transmission (ST 105). In addition, base station 100, for example, transmits a control signal (e.g., Preemption Indication (PI)) for the terminal 1, which performs eMBB transmission, that URLLC transmission occurs in another terminal (e.g., terminal 2) (ST201). Terminal 1, which performs eMBB transmission, acquires the PI indicated from base station 100 (ST202), and controls the eMBB transmission operation of terminal 1 on the basis of URLLC transmission based on the PI and the DMRS setting of eMBB transmission. Terminal 1 then transmits a signal of eMBB transmission based on the determined transmission operation (ST203), and terminal 2 transmits a signal of URLLC transmission (ST204).

Note that a UE-specific or group-common DCI may be used for the indication of the PI.

Further, there are two cases for each of Intra-UE multiplexing and Inter-UE multiplexing, and a total of four combinations (hereinafter referred to as Case 1, Case 2, Case 3 and Case 4) are assumed.

[Case 1]

The first case (Case 1) is a case where the transmission power difference between URLLC transmission and eMBB transmission is within a controllable range in a baseband in Intra-UE multiplexing. In Case 1, no phase discontinuity occurs in eMBB transmission even when terminal 200 discards eMBB transmission in a section overlapped in time with URLLC transmission in an eMBB transmission section.

Note that, in Case 1, DMRS of eMBB transmission can be used for URLLC transmission when the frequency resources respectively allocated to eMBB transmission and URLLC transmission are the same (or partially overlapped). DMRS of URLLC transmission can also be used for eMBB.

[Case 2]

The second case (Case 2) is a case where the transmission power difference between URLLC transmission and eMBB transmission exceeds a controllable range in a baseband in Intra-UE multiplexing. In Case 2, phase discontinuity occurs in eMBB transmission when terminal 200 discards eMBB transmission in a section overlapped in time with URLLC transmission in an eMBB transmission section.

[Case 3]

The third case (Case 3) is a case where a base band controls and discards eMBB transmission (i.e., turns off the transmission or sets the transmission power to 0) in Inter-UE multiplexing. As in Case 1, no phase discontinuity occurs in eMBB transmission in Case 3 even when terminal 200, which performs eMBB transmission, discards eMBB transmission in a section overlapped in time with URLLC transmission in another terminal 200.

[Case 4]

The fourth case (Case 4) is a case where an RF circuit controls and discards eMBB transmission (i.e., turns off the transmission or sets transmission power to 0) in Inter-UE multiplexing. As in Case 2, phase discontinuity occurs in eMBB transmission in Case 4 when terminal 200, which performs eMBB transmission, discards eMBB transmission in a section overlapped in time with URLLC transmission in another terminal 200.

The operations of Embodiments 1 to 5 described above have the following effects for each of the above four cases (Cases 1 to 4).

For Embodiment 1

It is not necessary to apply Embodiment 1 to Cases 1 and 3.

In Cases 2 and 4, terminal 200 cancels eMBB transmission, by applying Embodiment 1, when no DMRS is included in URLLC-transmission-interrupted or subsequent symbols and base station 100 cannot demodulate the data symbols (for example, see FIG. 11A), thereby preventing the deterioration of the eMBB transmission quality.

In Cases 2 and 4, when DMRS is included in URLLC-transmission-interrupted or subsequent symbols (for example, see FIG. 11B), however, base station 100 may be able to demodulate eMBB data symbols in URLLC-transmission-interrupted and subsequent symbols by a channel estimate using the DMRS. This makes it possible to suppress the deterioration of the frequency utilization efficiency compared with the case of canceling eMBB transmission.

For Embodiment 2

In Case 1, base station 100 can demodulate the data symbols after URLLC transmission using the DMRS prior to URLLC transmission by applying Option 1 of Embodiment 2 (see, for example, FIG. 12).

Further, in Case 1, when DMRS is included in URLLC-transmission-interrupted or subsequent symbols and base station 100 (the receiving side) performs channel estimation using a plurality of DMRSs (e.g., channel estimation using filtering), it is possible to prevent the channel estimation accuracy from significantly deteriorating due to a loss of any of DMRSs.

In addition, in Case 1, DMRS of eMBB transmission can be used for URLLC transmission when eMBB transmission and URLLC transmission simultaneously occur in the same terminal 200 and the frequency resources respectively allocated to eMBB transmission and URLLC transmission are the same (or partially overlapped). DMRS of URLLC transmission can also be used for eMBB.

In Case 2, terminal 200 cancels eMBB transmission, by applying Option 2 of Embodiment 2, when no DMRS is included in URLLC-transmission-interrupted or subsequent symbols and base station 100 cannot demodulate the data symbols (for example, see FIG. 13A), thereby preventing deterioration of the eMBB transmission quality. When DMRS is included in URLLC-transmission-interrupted or subsequent symbols (for example, see FIG. 13B), however, base station 100 may be able to demodulate eMBB data symbols in URLLC-transmission-interrupted and subsequent symbols by a channel estimate using the DMRS. This makes it possible to suppress the deterioration of the frequency utilization efficiency compared with the case of canceling eMBB transmission.

Further, in Case 2, terminal 200 can cancel eMBB transmission, by applying Option 3 of Embodiment 2 (for example, see FIGS. 14A, 14B, and 14C), when DMRS is included in URLLC-transmission-interrupted or subsequent symbols and the data symbol demodulation accuracy may be significantly deteriorated, in the case that base station 100 (the receiving side) performs channel estimation using a plurality of DMRSs (e.g., channel estimation using filtering). Meanwhile, the phase discontinuity does not affect among a plurality of DMRSs when terminal 200 shifts URLLC transmission to avoid a loss of the last DMRS in eMBB transmission (see, for example, FIG. 14C), in the case that additional DMRS is set in URLLC-transmission-interrupted or subsequent symbols.

In Cases 3 and 4, Embodiment 2 can be applied as in Cases 1 and 2 described above when, for example, terminal 200 is aware of the arrangement of DMRS in another terminal.

For Embodiment 3

In Cases 1 and 3, base station 100 can efficiently control the transmission of terminal 200 suitable for the channel estimation method by applying Embodiment 3 (for example, see FIGS. 15A and 15B).

For Embodiment 4

In Case 1, base station 100 can demodulate data symbols in URLLC-transmission-interrupted and subsequent symbols using DMRS prior to URLLC transmission (see, for example, FIGS. 17A and 17B) by applying Embodiment 4. Further, in Case 1, when DMRS is included in URLLC-transmission-interrupted or subsequent symbols (see, for example, FIG. 17B) and base station 100 performs channel estimation using a plurality of DMRSs (e.g., channel estimation using filtering), it is possible to prevent the channel estimation accuracy from significantly deteriorating due to a loss of any of DMRSs.

In addition, DMRS of eMBB transmission can be used for URLLC transmission when eMBB transmission and URLLC transmission simultaneously occur in the same terminal 200 and the frequency resources respectively allocated to eMBB transmission and URLLC transmission are the same (or partially overlapped). DMRS of URLLC transmission can also be used for eMBB.

Further, in Case 1, terminal 200 can determine its transmission operation according to URLLC transmission (e.g., the position of the symbol where URLLC transmission occurs), and does not require complicated condition determination for determining its transmission operation by applying Embodiment 4.

In Cases 2 and 4, terminal 200 cancels eMBB transmission, by applying Embodiment 4, even when no DMRS is included in URLLC-transmission-interrupted or subsequent symbols and base station 100 cannot demodulate the data symbols, thereby preventing the deterioration of the eMBB transmission quality. When DMRS is included in URLLC-transmission-interrupted or subsequent symbols, however, base station 100 may be able to demodulate eMBB data symbols in URLLC-transmission-interrupted and subsequent symbols by a channel estimate using the DMRS. This makes it possible to suppress the deterioration of the frequency utilization efficiency compared with the case of canceling eMBB transmission.

Further, in Cases 2 and 4, terminal 200 can determine its transmission operation according to URLLC transmission (e.g., the position of the symbol where URLLC transmission occurs), and does not require complicated condition determination for determining its transmission operation by applying Embodiment 4.

In Case 3, base station 100 can demodulate the data symbols in URLLC-transmission-interrupted and subsequent symbols using the DMRS prior to URLLC transmission by applying Embodiment 4.

In addition, in Case 3, when DMRS is included in URLLC-transmission-interrupted or subsequent symbols and base station 100 performs channel estimation using a plurality of DMRSs (e.g., channel estimation using filtering), it is possible to prevent the channel estimation accuracy from significantly deteriorating due to a loss of any of DMRSs.

Further, in Case 3, terminal 200 can determine its transmission operation according to URLLC transmission (e.g., the position of the symbol where URLLC transmission occurs), and does not require complicated condition determination for determining its transmission operation by applying Embodiment 4.

For Embodiment 5

In Cases 2 and 4, DMRS can be transmitted in URLLC-transmission-interrupted or subsequent symbols by applying Embodiment 5, thereby suppressing the deterioration of the frequency utilization efficiency compared with the case of canceling eMBB transmission.

(Variation 2)

NR includes a transmission method that allows a terminal to transmit uplink data without a UL grant from a base station. This transmission method may be called "Grant-free uplink transmission" or "Configured-grant uplink transmission". Hereinafter, this transmission method is simply referred to as "Grant-free transmission".

In Intra-UE multiplexing, each of the above-described embodiments can be applied to Grant-free transmission. In this case, Grant-free transmission corresponds to URLLC transmission.

Figure 21:
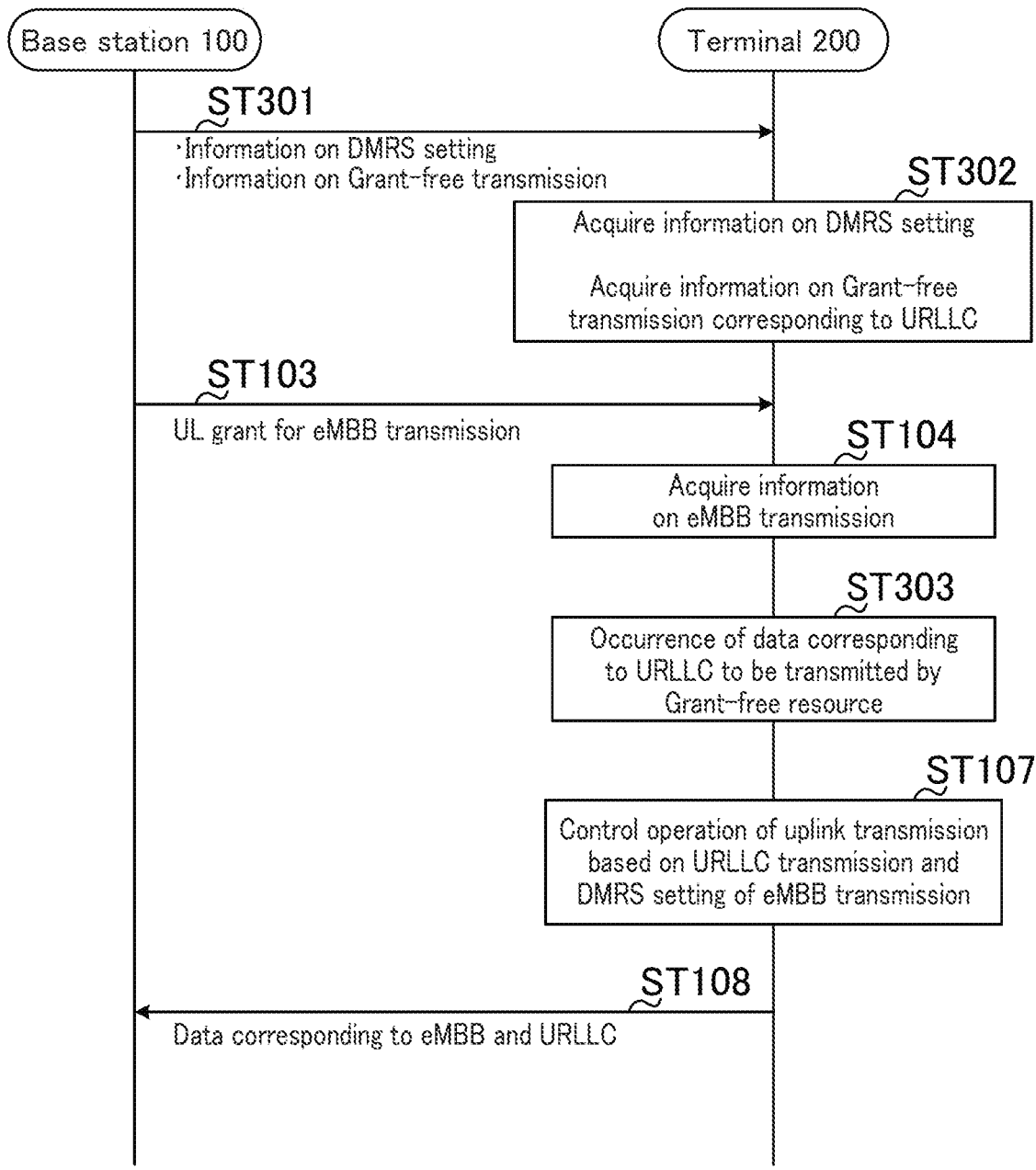
FIG. 21 is a sequence diagram illustrating processes in the base station and the terminal in Grant-free URLLC.

FIG. 21 illustrates the flow of processes in base station 100 and terminal 200 when Grant-free transmission is applied to URLLC transmission. Note that, in FIG. 21, the same processing as the processing illustrated in FIG. 9 is denoted by the same reference signs, and the explanation thereof is omitted.

Base station 100 transmits information on Grant-free transmission (e.g., resource information allocated to Grant-free transmission or a transmission parameter such as MCS) to terminal 200 (ST301). The information on Grant-free transmission may be transmitted with information on a DMRS setting, or may be transmitted separately from the information on the DMRS setting. Terminal 200 acquires the information on Grant-free transmission (ST302).

Terminal 200 assigns a URLLC transmission signal (e.g., URLLC PUSCH) to a recourse of Grant-free transmission when URLLC transmission occurs (ST303).

Figure 20:
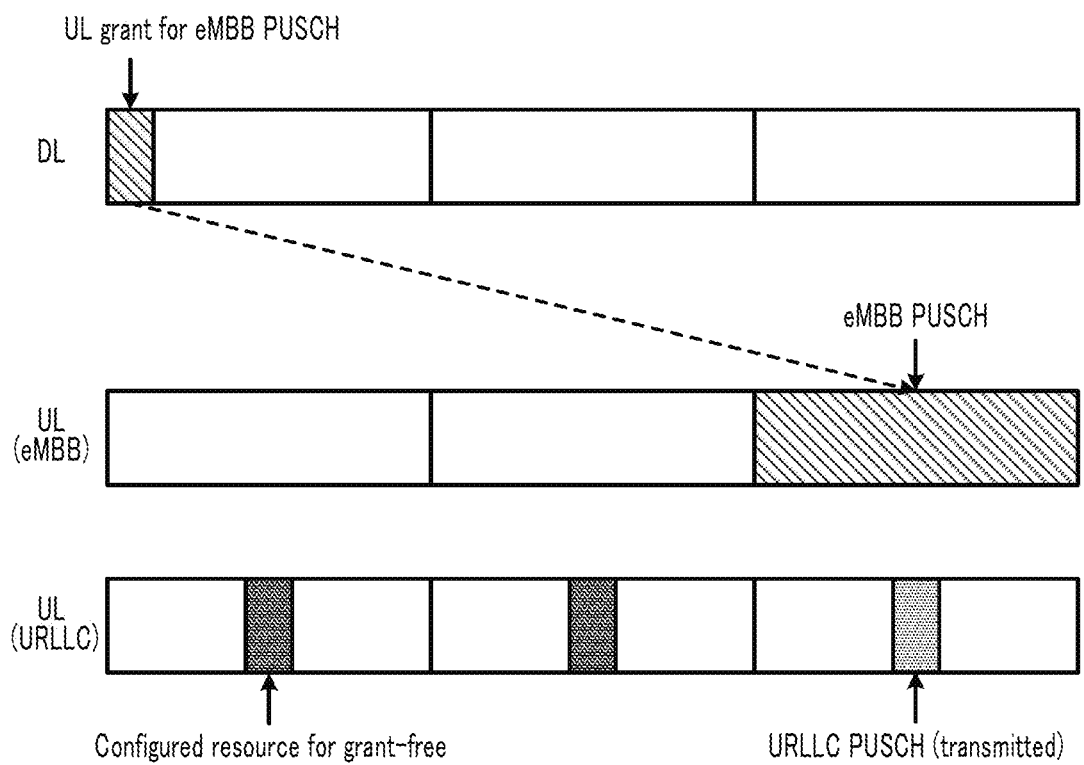
FIG. 20 is a diagram illustrating an exemplary Grant-free uplink transmission.

For example, terminal 200 preferentially transmits Grant-free transmission, as illustrated in FIG. 20, when eMBB transmission (eMBB PUSCH) and Grant-free transmission (URLLC PUSCH) simultaneously occur. At this time, terminal 200 may determine the operation of eMBB transmission when Grant-free transmission occurs and after the Grant-free transmission by applying any one of the methods in the above-described embodiments to eMBB transmission. In addition, terminal 200 may shift Grant-free transmission in time, as in Embodiment 2, so as not to overlap with DMRS of eMBB transmission.

Note that, in Inter-UE multiplexing, each of the above-described embodiments can be applied to Grant-free transmission corresponding to URLLC transmission when terminal 200 can recognize the presence of Grant-free uplink transmission in another terminal. The presence of Grant-free uplink transmission in another terminal may be notified, for example, from the terminal or base station 100.

(Variation 3)

Figure 22:
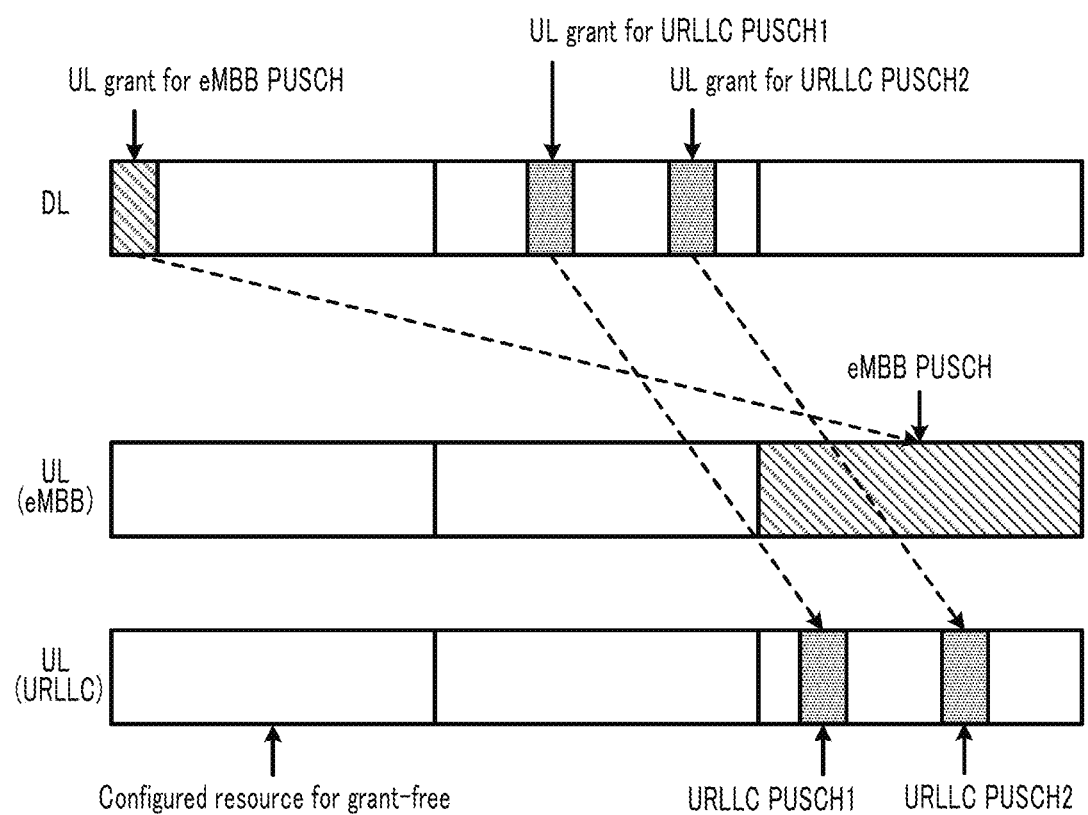
FIG. 22 is a diagram illustrating an example in which a transmission corresponding to eMBB and a plurality of transmissions corresponding to URLLC occur.

In the above embodiments, descriptions have been given of the case where one URLLC transmission occurs simultaneously with respect to eMBB transmission. The above-described embodiments, however, can also be applied to a case where a plurality of URLLC transmissions occur simultaneously with respect to eMBB transmission, as illustrated in FIG. 22. For example, in FIG. 22, terminal 200 controls its uplink transmission operation by applying any one of the above-described embodiments to the first URLLC transmission in an eMBB transmission section. Then, terminal 200 may control its transmission operation by applying any one of the above-described embodiments again to another URLLC transmission that follows the first URLLC transmission in eMBB transmission whose transmission operation has been controlled with respect to the first URLLC transmission (i.e., after the application of an embodiment described above).

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and every "things" that may exist on Internet of Things (IoT) networks.

In addition to data communication via cellular systems, wireless LAN systems, communication satellite systems and/or the like, communication includes data communication via a combination of these systems.

Moreover, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A terminal according to the present disclosure includes: circuitry, which, in operation, determines a transmission operation of a first transmission corresponding to a first service, and a second transmission corresponding to a second service, based on the first transmission and a setting of a reference signal included in the second transmission; and a transmitter, which in operation, transmits an uplink signal including at least a signal of the first transmission based on the determined transmission operation.

In the terminal according to the present disclosure, when the first transmission and the second transmission overlap with each other, the circuitry cancels the second transmission in a first transmission section corresponding to the first transmission and a section after the first transmission section in a case that the reference signal is not included in the first transmission section or the section after the first transmission section in a second transmission section corresponding to the second transmission, and the circuitry performs the second transmission in a section other than the first transmission section in a case that the reference signal is included in the first transmission section or the section after the first transmission section in the second transmission section.

In the terminal according to the present disclosure, when the first transmission and the second transmission overlap with each other, the circuitry shifts a first transmission section to a section other than a section where the first transmission section corresponding to the first transmission overlaps with a second transmission section corresponding to the second transmission, in a case that the reference signal is included in the overlapping section.

In the terminal according to the present disclosure, the circuitry performs the second transmission in a section other than a section to which the first transmission has been shifted in the second transmission section.

In the terminal according to the present disclosure, the circuitry cancels the second transmission in the shifted first transmission section and a section after the shifted first transmission section when the reference signal is not included in the shifted first transmission section or the section after the shifted first transmission section in the second transmission section, and the circuitry performs the second transmission in a section other than the shifted first transmission section when the reference signal is included in the shifted first transmission section or the section after the shifted first transmission section in the second transmission section.

In the terminal according to the present disclosure, the circuitry cancels the second transmission in the shifted first transmission section and a section after the shifted first transmission section in the second transmission section.

In the terminal according to the present disclosure, information is indicated from a base station to the terminal, the information indicating either of operations of canceling the second transmission in a first transmission section corresponding to the first transmission, and a section after the first transmission section in a second transmission section corresponding to the second transmission, or performing the second transmission in a section other than the first transmission section in the second transmission section.

In the terminal according to the present disclosure, either of operations is associated with each time unit, the operations being an operation of canceling the second transmission in a first transmission section corresponding to the first transmission, and a section after the first transmission section in a second transmission section corresponding to the second transmission, and an operation of performing the second transmission in a section other than the first transmission section in the second transmission section, and the circuitry determines an operation of the second transmission according to the time unit where the first transmission occurs.

In the terminal according to the present disclosure, the circuitry sets the reference signal after a first transmission section in a second transmission section corresponding to the second transmission, when the reference signal is not included in the first transmission section or a section after the first transmission section in the second transmission section.

A transmission method according to the present disclosure includes: determining a transmission operation of a first transmission corresponding to a first service and a second transmission corresponding to a second service based on the first transmission and a setting of a reference signal included in the second transmission; and transmitting an uplink signal including at least a signal of the first transmission based on the determined transmission operation.

The disclosure of Japanese Patent Application No. 2018-090118, filed on May 8, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100 Base station
101, 209 Controller
102 Higher-layer control signal generator
103, 106, 210, 212 Encoder
104, 107, 211, 213 Modulator
105 Downlink control signal generator
108, 214 Signal assigner
109, 215 Inverse Fast Fourier Transformer (IFFT)
110, 216 Transmitter
111, 201 Antenna
112, 202 Receiver
113, 203 Fast Fourier Transformer (FFT)
114, 204 Extractor
115 Channel estimator
116 Demodulator
117 Decoder
118 Determiner
200 Terminal
205 Downlink control signal demodulator
206, 208 Decoder
207 Higher-layer control signal demodulator

The invention claimed is:

1. A terminal, comprising:
circuitry, which, in operation, determines a transmission operation of a first uplink transmission corresponding to a first service, and a second uplink transmission corresponding to a second service, based on the first uplink transmission and a setting of a reference signal included in the second uplink transmission; and
a transmitter, which, in operation, transmits an uplink signal including at least a signal of the first uplink transmission based on the determined transmission operation, wherein:
when the first uplink transmission and the second uplink transmission overlap with each other,
the circuitry, for a second transmission section corresponding to the second uplink transmission, cancels the second uplink transmission in and after a first transmission section corresponding to the first uplink transmission in a case that the reference signal is not included in or after the first transmission section, and
the circuitry, for the second transmission section, performs the second uplink transmission in a section other than the first transmission section in a case that the reference signal is included in or after the first transmission section.

2. A terminal, comprising:
circuitry, which, in operation, determines a transmission operation of a first uplink transmission corresponding to a first service, and a second uplink transmission corresponding to a second service, based on the first uplink transmission and a setting of a reference signal included in the second uplink transmission; and
a transmitter, which, in operation, transmits an uplink signal including at least a signal of the first uplink transmission based on the determined transmission operation,
wherein information is notified from a base station to the terminal, the information indicating either of operations of, for a second transmission section corresponding to the second uplink transmission, canceling the second uplink transmission in or after a first transmission section corresponding to the first uplink transmission, or, for the second transmission section, performing the second uplink transmission in a section other than the first transmission section.

3. The terminal according to claim 1, wherein:
either of operations is associated with each time unit, the operations being an operation of canceling the second uplink transmission in and after the first transmission section corresponding to the first uplink transmission for the second transmission section corresponding to the second uplink transmission, and an operation of performing the second uplink transmission in the section other than the first transmission section for the second transmission section, and the circuitry determines an operation of the second uplink transmission according to the time unit where the first uplink transmission occurs.

4. The terminal according to claim 1, wherein the circuitry sets the reference signal after the first transmission section corresponding to the first uplink transmission in the second transmission section corresponding to the second uplink transmission, when the reference signal is not included in the first transmission section or a section after the first transmission section in the second transmission section.

5. A transmission method, comprising:
determining a transmission operation of a first uplink transmission corresponding to a first service and a second uplink transmission corresponding to a second service based on the first uplink transmission and a setting of a reference signal included in the second uplink transmission; and
transmitting an uplink signal including at least a signal of the first uplink transmission based on the determined transmission operation, wherein:
when the first uplink transmission and the second uplink transmission overlap with each other, the transmission method further comprises:
for a second transmission section corresponding to the second uplink transmission, cancelling the second uplink transmission in and after a first transmission section corresponding to the first uplink transmission in a case that the reference signal is not included in or after the first transmission section, and
for the second transmission section, performing the second uplink transmission in a section other than the first transmission section in a case that the reference signal is included in or after the first transmission section.

\* \* \* \* \*